(12) United States Patent
Chen

(10) Patent No.: US 9,116,332 B2
(45) Date of Patent: Aug. 25, 2015

(54) ZOOM LENS

(71) Applicants: Sintai Optical (Shenzhen) Co., Ltd., Shenzhen, Guandong Province (CN); Asia Optical International Ltd., Tortola (GB)

(72) Inventor: Ming-Chung Chen, Taichung (TW)

(73) Assignees: SINTAI OPTICAL (SHENZHEN) CO., LTD., Shenzhen, Guangdong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/091,377

(22) Filed: Nov. 27, 2013

(65) Prior Publication Data
US 2014/0153109 A1    Jun. 5, 2014

(30) Foreign Application Priority Data
Dec. 5, 2012    (TW) .............................. 101145587 A

(51) Int. Cl.
*G02B 15/14*    (2006.01)
(52) U.S. Cl.
CPC .................... *G02B 15/14* (2013.01)

(58) Field of Classification Search
CPC ....................................................... G02B 15/14
USPC ............................................................. 359/687
See application file for complete search history.

(56) References Cited

U.S. PATENT DOCUMENTS

| 5,412,507 A * | 5/1995 | Sato ............................... 359/687 |
| 8,184,388 B2 | 5/2012 | Matsuo |
| 2005/0046962 A1* | 3/2005 | Nanba ............................ 359/687 |
| 2006/0056055 A1* | 3/2006 | Obama et al. .................. 359/689 |

FOREIGN PATENT DOCUMENTS

JP    2010191181 A    9/2010

* cited by examiner

*Primary Examiner* — William Choi
(74) *Attorney, Agent, or Firm* — McClure, Qualey & Rodack, LLP

(57) ABSTRACT

A zoom lens includes a first lens group, a second lens group, a third lens group and a fourth lens group, all of which are arranged in sequence from an object side to an image side along an optical axis. The first lens group is with positive refractive power and includes a first lens that is with negative refractive power and a second lens that is with positive refractive power. The second lens group is with negative refractive power. The third lens group is with positive refractive power and includes a third lens front group that is with positive refractive power and a third lens rear group that is with positive refractive power. The fourth lens group is with positive refractive power.

18 Claims, 24 Drawing Sheets

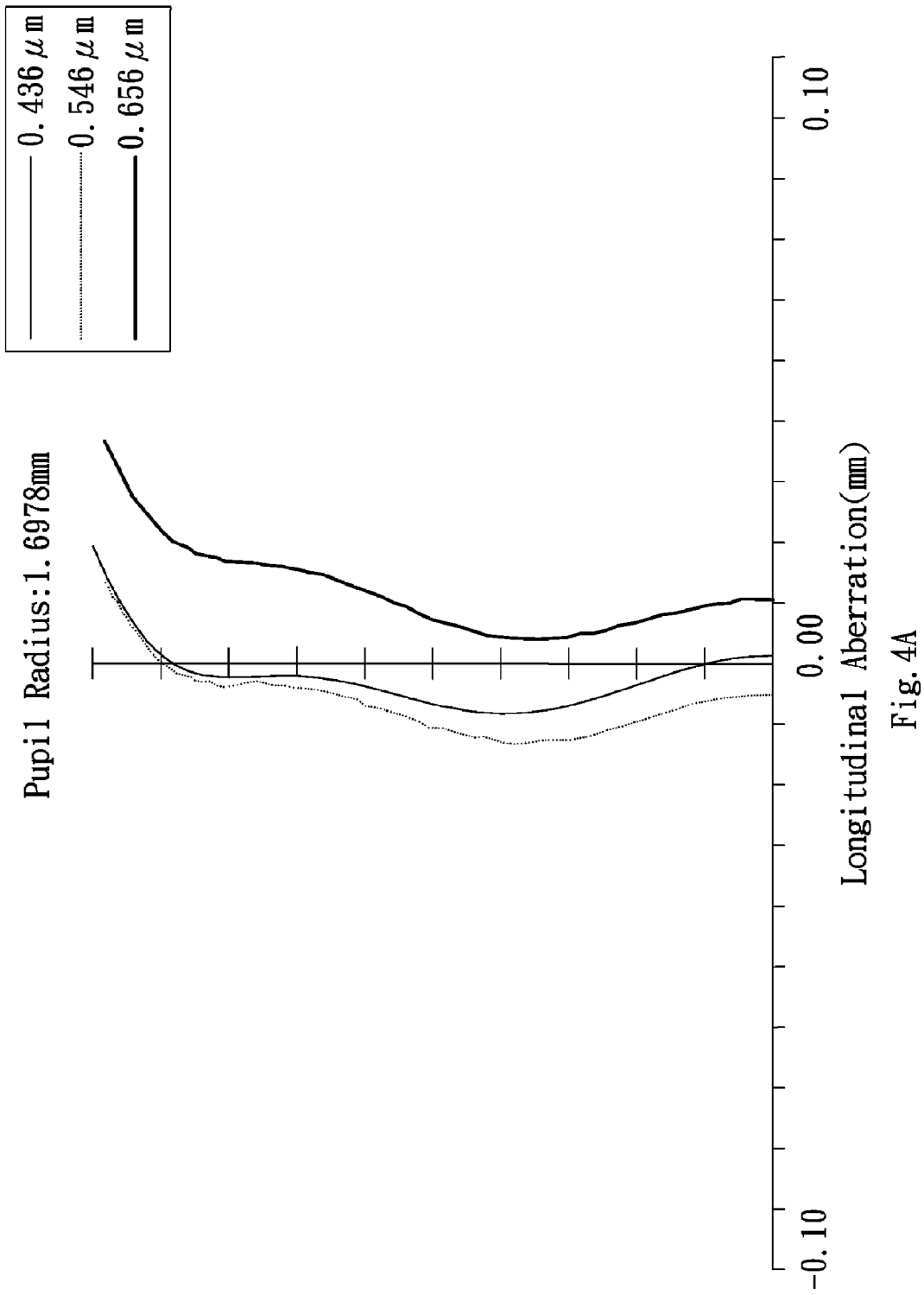

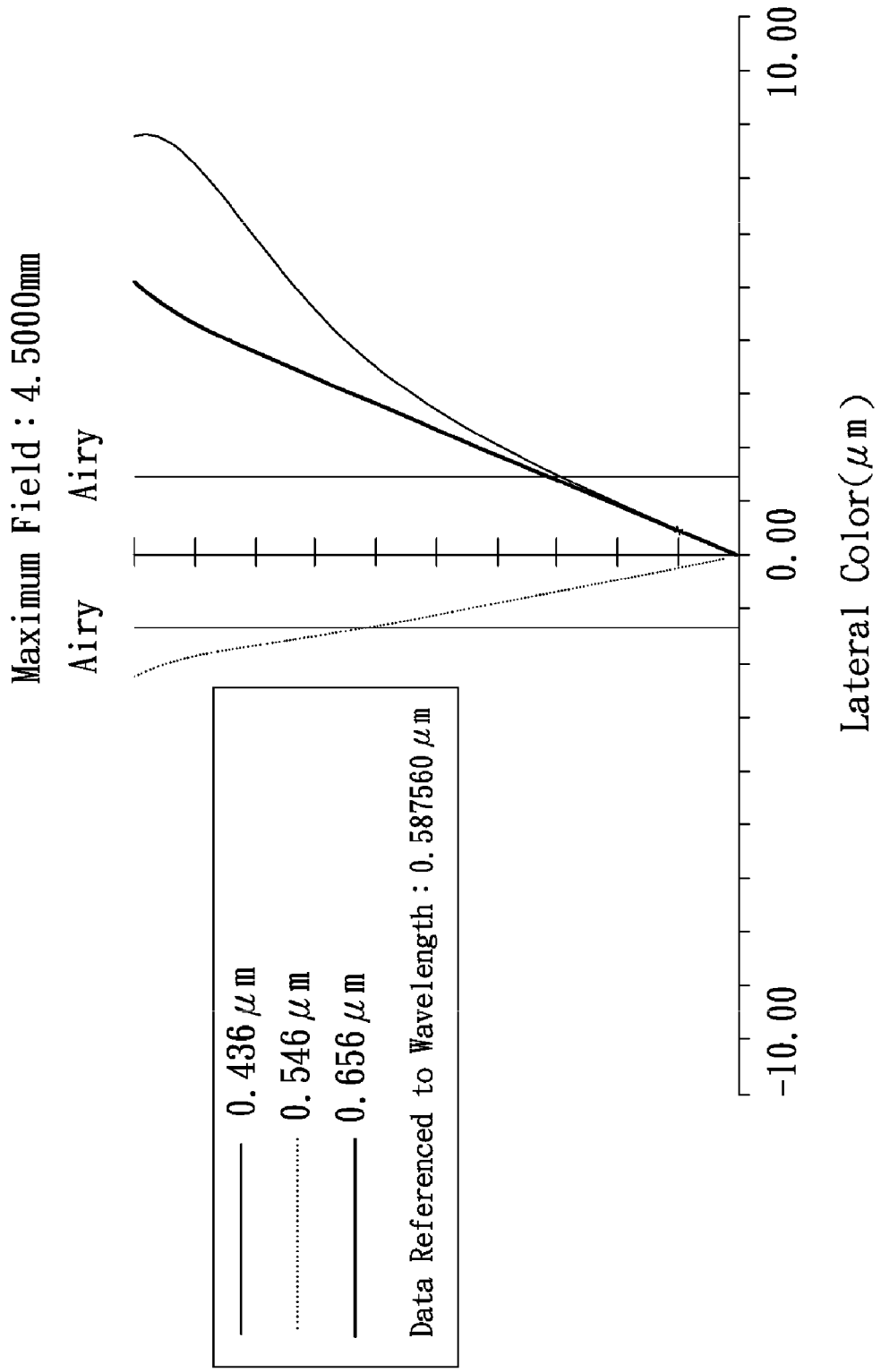

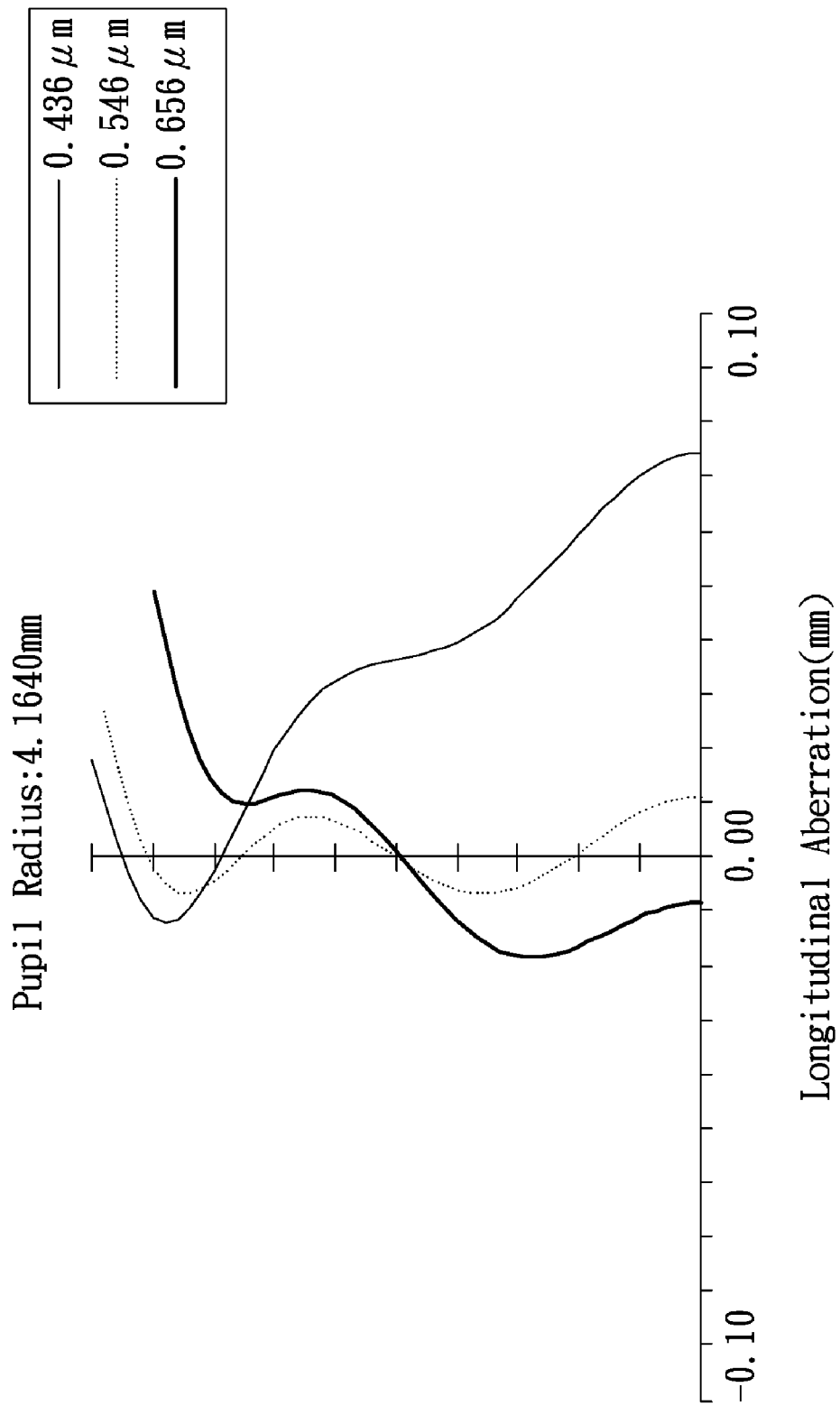

ZOOM LENS

BACKGROUND OF THE INVENTION

1. Field of the Invention

The invention relates to a lens, and more particularly to a zoom lens.

2. Description of the Related Art

A zoom lens differs from a fixed focal length lens in that the focal length of a zoom lens is adjustable within a certain range. When a zoom lens zooms to a telephoto end, the distant object looks closer and magnified. When a zoom lens zooms to a wide-angle end, the field of view is expanded to accommodate a wider range of image. The fixed focal length lens doesn't have zoom in and zoom out function as the zoom lens has, so the current digital still cameras and digital video cameras are mostly equipped with zoom lens.

Zoom lens is developed toward high zoom ratio, smaller F-number and high resolution as higher image quality and a variety of applications are required by users. However, it is not easy to achieve that a zoom lens of a high zoom ratio has smaller F-number and high resolution.

BRIEF SUMMARY OF THE INVENTION

The invention provides a zoom lens to solve the above problems. The zoom lens has a medium zoom ratio and still has a smaller F-number and a performance of high resolution.

The zoom lens in accordance with an exemplary embodiment of the invention includes a first lens group, a second lens group, a third lens group and a fourth lens group, all of which are arranged in sequence from an object side to an image side along an optical axis. The first lens group is with positive refractive power and includes a first lens that is with negative refractive power and a second lens that is with positive refractive power, both of which are arranged in sequence from the object side to the image side along the optical axis. The second lens group is with negative refractive power. The third lens group is with positive refractive power and includes a third lens front group that is with positive refractive power and a third lens rear group that is with positive refractive power, both of which are arranged in sequence from the object side to the image side along the optical axis. The fourth lens group is with positive refractive power.

In another exemplary embodiment, the first lens group, the second lens group, the third lens group and the fourth lens group are movable along the optical axis when the zoom lens zooms.

In yet another exemplary embodiment, an interval between the first lens group and the second lens group increases, an interval between the second lens group and the third lens group decreases and an interval between the third lens group and the fourth lens group varies when the zoom lens zooms from wide-angle end to telephoto end.

In another exemplary embodiment, the zoom lens satisfies the following conditions:

$$0.2 < f3/f3a < 0.7$$

$$0.21 < dg3/fw < 0.8$$

wherein f3 is the effective focal length of the third lens group, f3a is the effective focal length of the third lens front group, dg3 is the interval between the third lens front group and the third lens rear group and fw is the effective focal length of the zoom lens at wide-angle end.

In yet another exemplary embodiment, the second lens group and the third lens group satisfy:

$$0.32 < (\beta 2t/\beta 2w)/(\beta 3t/\beta 3w) < 0.7$$

wherein $\beta 2w$ is the lateral magnification of the second lens group at wide-angle end, $\beta 2t$ is the lateral magnification of the second lens group at telephoto end, $\beta 3w$ is the lateral magnification of the third lens group at wide-angle end and $\beta 3t$ is the lateral magnification of the third lens group at telephoto end.

In another exemplary embodiment, the third lens front group includes a sixth lens, the sixth lens is with positive refractive power.

In yet another exemplary embodiment, the sixth lens includes two surfaces, at least one of which is an aspheric surface.

In another exemplary embodiment, the sixth lens includes two surfaces, both of which are aspheric surfaces.

In yet another exemplary embodiment, the third lens rear group includes a seventh lens, an eighth lens and a ninth lens, all of which are arranged in sequence from the object side to the image side along the optical axis, wherein the seventh lens is with positive refractive power, the eighth lens is with positive refractive power and the ninth lens is with negative refractive power.

In another exemplary embodiment, the seventh lens includes two surfaces, at least one of which is an aspheric surface.

In yet another exemplary embodiment, the seventh lens includes two surfaces, both of which are aspheric surfaces.

In another exemplary embodiment, the eighth lens includes two surfaces, at least one of which is an aspheric surface.

In yet another exemplary embodiment, the eighth lens includes two surfaces, both of which are aspheric surfaces.

In another exemplary embodiment, the ninth lens includes two surfaces, at least one of which is an aspheric surface.

In yet another exemplary embodiment, the ninth lens includes two surfaces, both of which are aspheric surfaces.

In another exemplary embodiment, the fourth lens group includes a tenth lens, the tenth lens is with positive refractive power.

In yet another exemplary embodiment, the tenth lens is made of plastic material.

In another exemplary embodiment, the tenth lens includes two surfaces, at least one of which is an aspheric surface.

In yet another exemplary embodiment, the tenth lens includes two surfaces, both of which are aspheric surfaces.

In another exemplary embodiment, the zoom lens further includes a stop disposed between the second lens group and the third lens group, wherein an interval between the stop and the third lens group is stationary.

In yet another exemplary embodiment, the zoom lens further includes an optical filter disposed between the fourth lens group and an image plane.

A detailed description is given in the following embodiment with reference to the accompanying drawings.

BRIEF DESCRIPTION OF THE DRAWINGS

The invention can be more fully understood by reading the subsequent detailed description and examples with references made to the accompanying drawings, wherein:

FIG. 4A is a longitudinal aberration diagram of a zoom lens at wide-angle end in accordance with an embodiment of the invention;

FIG. 4G is a lateral color diagram of a zoom lens at wide-angle end in accordance with an embodiment of the invention;

FIG. 6A is a longitudinal aberration diagram of a zoom lens at telephoto end in accordance with an embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
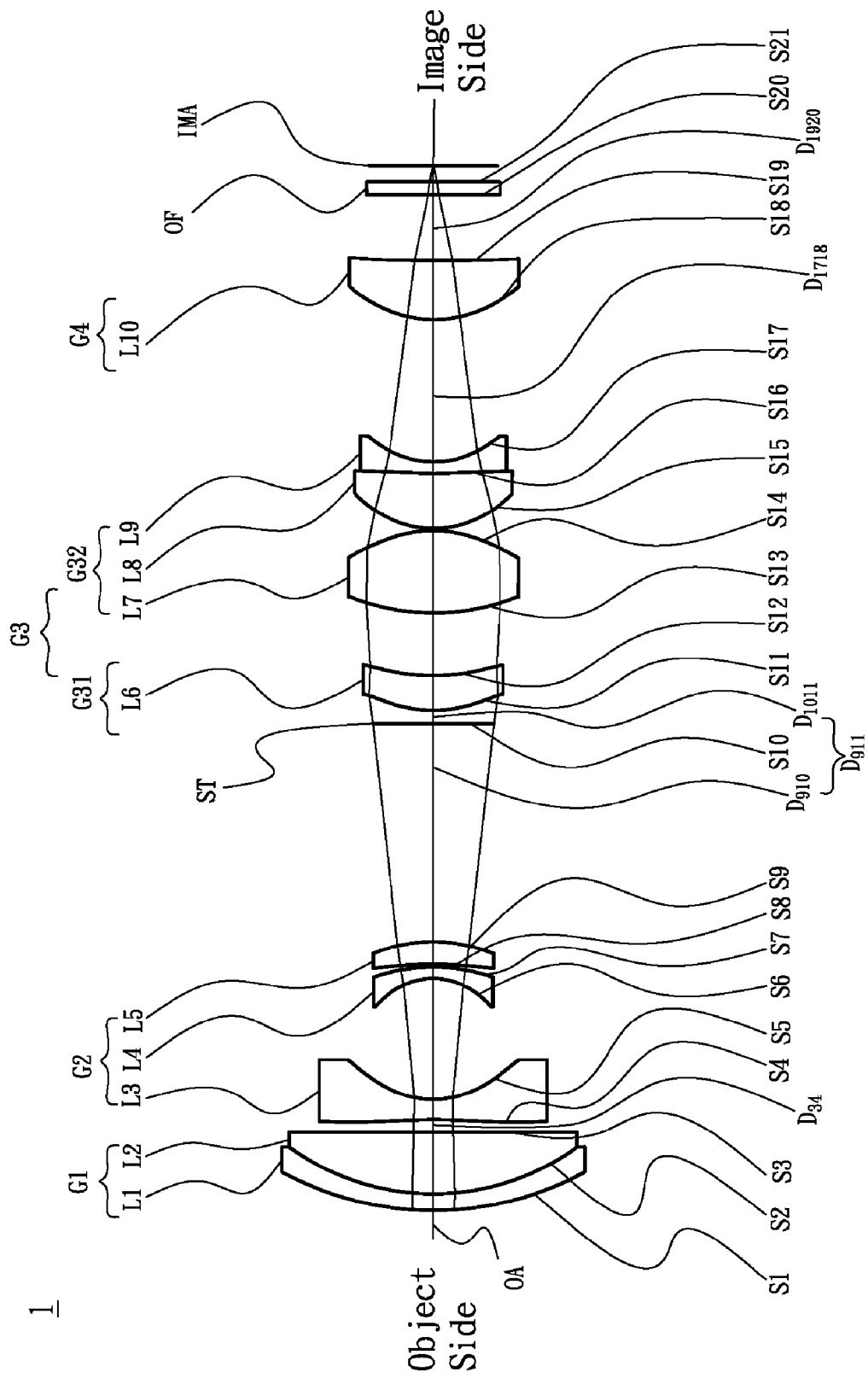
FIG. 1 is a lens layout and optical path diagram of a zoom lens at wide-angle end in accordance with an embodiment of the invention.
Figure 2:
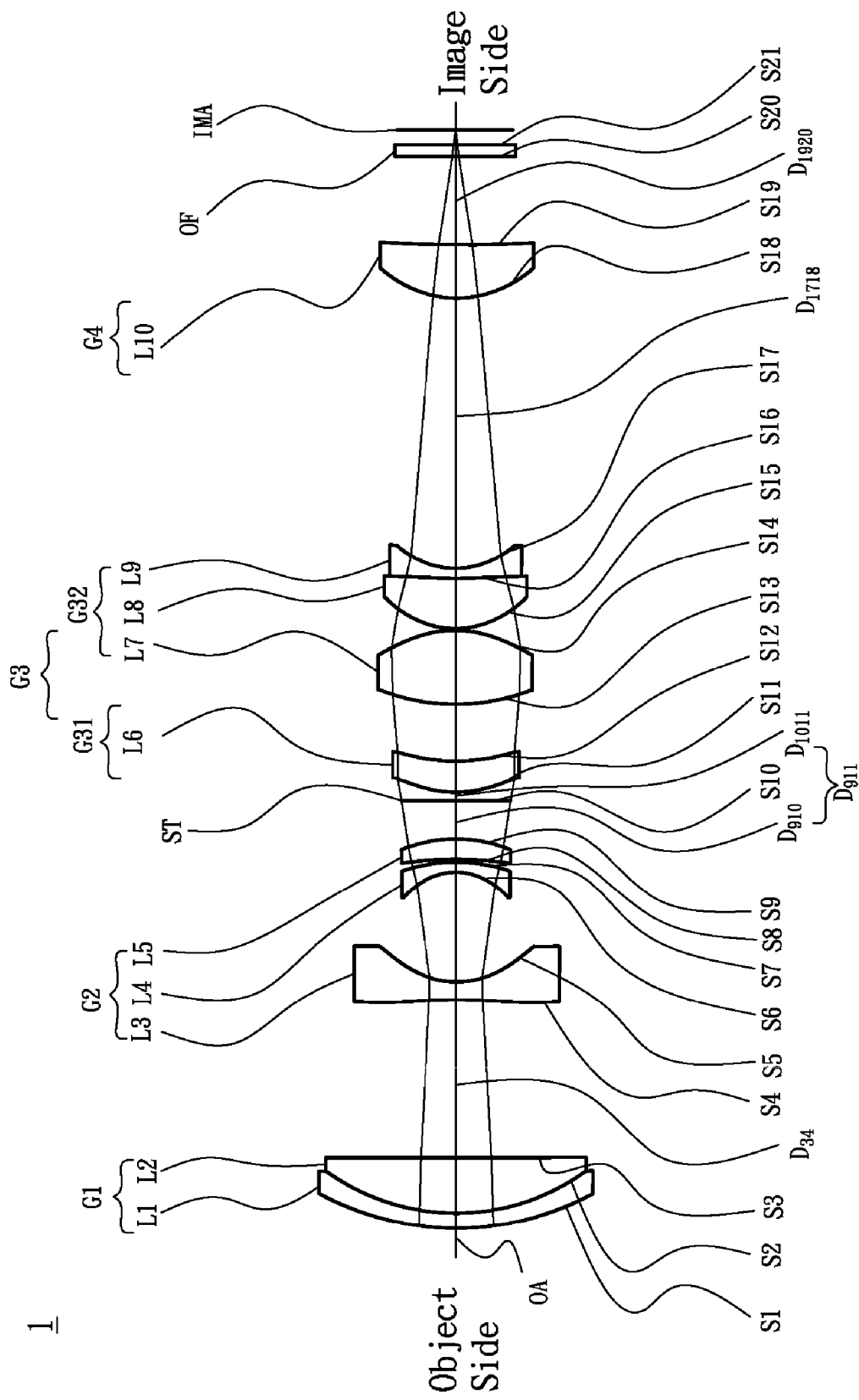
FIG. 2 is a lens layout and optical path diagram of a zoom lens at medium end in accordance with an embodiment of the invention.
Figure 3:
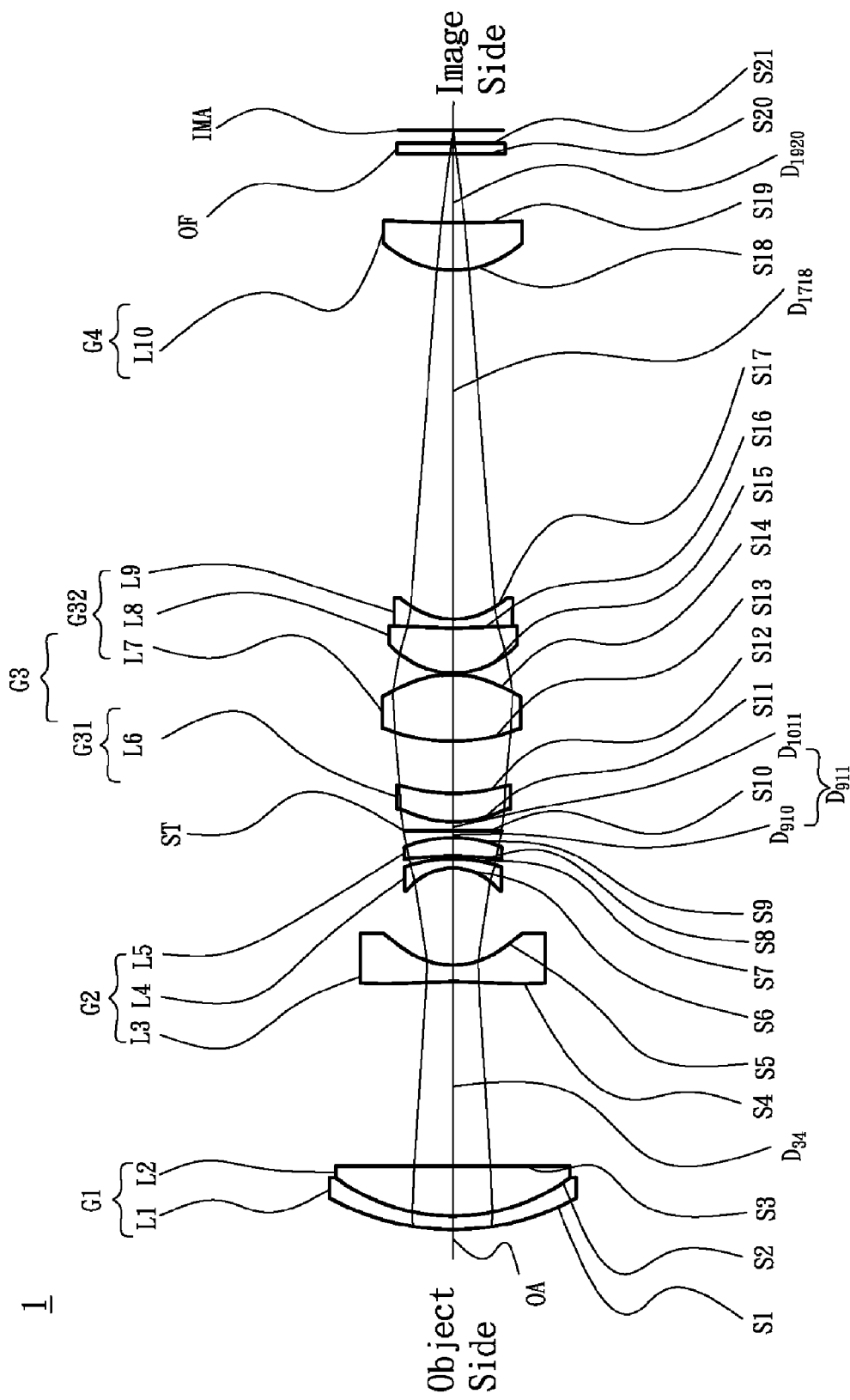
FIG. 3 is a lens layout and optical path diagram of a zoom lens at telephoto end in accordance with an embodiment of the invention.

Referring to FIG. 1, FIG. 2 and FIG. 3, FIG. 1 is a lens layout and optical path diagram of a zoom lens at wide-angle end in accordance with an embodiment of the invention, FIG. 2 is a lens layout and optical path diagram of a zoom lens at medium end in accordance with an embodiment of the invention and FIG. 3 is a lens layout and optical path diagram of a zoom lens at telephoto end in accordance with an embodiment of the invention. The zoom lens 1 includes a first lens group G1, a second lens group G2, a stop ST, a third lens group G3, a fourth lens group G4 and an optical filter OF, all of which are arranged in sequence from an object side to an image side along an optical axis OA. An interval $D_{34}$ between the first lens group G1 and the second lens group G2 increases, an interval $D_{911}$ between the second lens group G2 and the third lens group G3 decreases, an interval $D_{1718}$ between the third lens group G3 and the fourth lens group G4 varies and an interval $D_{1920}$ between the fourth lens group G4 and the object side surface S20 of the optical filter OF varies when the zoom lens 1 zooms from a wide-angle end to a telephoto end. The above interval variations arising from the zooming of the zoom lens 1 can be seen obviously from FIG. 1, FIG. 2 and FIG. 3. The displacements of each lens group become smaller and the time of zooming is shortened because all of the lens groups of the zoom lens 1 are movable along the optical axis OA.

In the present embodiment, the first lens group G1 is with positive refractive power, the second lens group G2 is with negative refractive power, the third lens group G3 is with positive refractive power and the fourth lens group G4 is with positive refractive power wherein the third lens group G3 includes a third lens front group G31 which is with positive refractive power, and a third lens rear group G32 which is with positive refractive power.

The first lens group G1 includes a first lens L1 and a second lens L2, both of which are arranged in sequence from the object side to the image side along the optical axis OA. The first lens L1 is made of glass material and with negative refractive power. The second lens L2 is made of glass material and with positive refractive power. The image side surface S2 of the first lens L1 and the object side surface S2 of the second lens L2 are cemented to form the surface S2.

The second lens group G2 includes a third lens L3, a fourth lens L4 and a fifth lens L5, all of which are arranged in sequence from the object side to the image side along the optical axis OA. The third lens L3 is made of glass material and includes an object side surface S4 and an image side surface S5, both of which are aspheric surfaces. The fourth lens is made of glass material. The fifth lens is made of glass material.

The third lens group G3 includes a third lens front group G31 and a third lens rear group G32, both of which are arranged in sequence from the object side to the image side along the optical axis OA. The third lens front group G31 includes a sixth lens L6. The third lens rear group G32 includes a seventh lens L7, an eighth lens L8 and a ninth lens L9, all of which are arranged in sequence from the object side to the image side along the optical axis OA. The sixth lens L6 is made of plastic material and with positive refractive power. The sixth lens L6 includes an object side surface S11 and an image side surface S12, both of which are aspheric surfaces. The seventh lens L7 is made of glass material and with positive refractive power. The seventh lens L7 includes an image side surface S14 that is an aspheric surface. The eighth lens L8 is made of glass material and with positive refractive power. The ninth lens L9 is made of glass material and with negative refractive power. The image side surface S16 of the eighth lens L8 and the object side surface S16 of the ninth lens L9 are cemented to form the surface S16.

The fourth lens group G4 includes a tenth lens L10. The tenth lens L10 is made of plastic material and with positive refractive power. The tenth lens L10 includes an object side surface S18 that is an aspheric surface.

An interval $D_{1011}$ between the stop ST and the third lens group G3 is stationary. The optical filter OF is a plate glass and includes an object side surface S20 and an image side surface S21. Both of the object side surface S20 and the image side surface S21 are plane surfaces.

In order to maintain excellent optical performance of the zoom lens 1 in accordance with an embodiment, the zoom lens 1 must satisfies the following three conditions:

$$0.2 < f3/f3a < 0.7 \quad (1)$$

$$0.21 < dg3/fw < 0.8 \quad (2)$$

$$0.32 < (\beta 2t/\beta 2w)/(\beta 3t/\beta 3w) < 0.7 \quad (3)$$

wherein f3 is the effective focal length of the third lens group G3, f3a is the effective focal length of the third lens front group G31, dg3 is the interval between the third lens front group G31 and the third lens rear group G32, fw is the effective focal length of the zoom lens 1 at wide-angle end, β2w is the lateral magnification of the second lens group G2 at wide-angle end, β2t is the lateral magnification of the second lens group G2 at telephoto end, β3w is the lateral magnification of the third lens group G3 at wide-angle end and β3t is the lateral magnification of the third lens group G3 at telephoto end.

Due to the above design of the lenses and stop ST, the zoom lens 1 at a medium zoom ratio is provided with a smaller F-number and a performance of high resolution.

In order to achieve the above purpose and effectively enhance the optical performance, the zoom lens 1 at the wide-angle end, medium end and telephoto end of the present embodiment of the invention is provided with the optical specifications shown in Table 1, which include the effective focal length, F-number, radius of curvature of each lens surface, interval between adjacent surface, refractive index of each lens and Abbe number of each lens. Table 1 shows that the effective focal length and F-number of the zoom lens 1 at the wide-angle end is equal to 6.50483 mm and 2.0, the effective focal length and F-number of the zoom lens 1 at the medium end is equal to 16.81973 mm and 2.5, the effective focal length and F-number of the zoom lens 1 at the telephoto end is equal to 24.44355 mm and 3.0, and the zoom ratio of the zoom lens 1 is about 3.8.

TABLE 1

| | | | | | |
|---|---|---|---|---|---|
| W(Wide-angle End) | Effective Focal Length = 6.50483 mm | | | F-number = 2.0 | |
| M(Medium End) | Effective Focal Length = 16.81973 mm | | | F-number = 2.5 | |
| T(Telephoto End) | Effective Focal Length = 24.44355 mm | | | F-number = 3.0 | |

| Surface Number | Radius of Curvature (mm) | Thickness (mm) | Nd | Vd | Remark |
|---|---|---|---|---|---|
| S1 | 32.28 | 1.04 | 1.847 | 23.80 | The First Lens Group G1 The First Lens L1 |
| S2 | 24.43 | 3.85 | 1.697 | 55.50 | The First Lens Group G1 The Second Lens L2 |
| S3 | −2520.07 | 0.77(W) 10.89(M) 14.2(T) | | | Interval $D_{34}$ |
| S4 | −60.45 | 1.26 | 1.854 | 40.40 | The Second Lens Group G2 The Third Lens L3 |
| S5 | 9.83 | 7.53 | | | |
| S6 | −7.03 | 0.70 | 1.589 | 60.10 | The Second Lens Group G2 The Fourth Lens L4 |
| S7 | −19.02 | 0.15 | | | |
| S8 | −44.14 | 1.40 | 1.923 | 18.90 | The Second Lens Group G2 The Fifth Lens L5 |
| S9 | −16.42 | 13.64(W) 2.93(M) 0.55(T) | | | Interval $D_{910}$ |
| S10 | ∞ | 0.80 | | | Stop ST Interval $D_{1011}$ |
| S11 | 13.77 | 2.17 | 1.535 | 56.10 | The Third Lens Group G3 The Sixth Lens L6 |
| S12 | 23.75 | 3.91 | | | |
| S13 | 23.14 | 5.11 | 1.497 | 81.50 | The Third Lens Group G3 The Seventh Lens L7 |
| S14 | −12.88 | 0.14 | | | |
| S15 | 10.28 | 3.44 | 1.497 | 81.50 | The Third Lens Group G3 The Eighth Lens L8 |
| S16 | 112.76 | 0.70 | 1.805 | 25.40 | The Third Lens Group G3 The Ninth Lens L9 |
| S17 | 9.23 | 8.88(W) 18.68(M) 26.7(T) | | | Interval $D_{1718}$ |
| S18 | 11.90 | 3.65 | 1.535 | 56.10 | The Fourth Lens Group G4 The Tenth Lens L10 |
| S19 | 136.27 | 4.08(W) 6.11(M) 5.31(T) | | | Interval $D_{1920}$ |
| S20 | ∞ | 0.8 | 1.52 | 64.10 | Optical Filter OF |
| S21 | ∞ | | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the present embodiment, the conic constant k and the aspheric coefficients A, B, C, D of each surface are shown in Table 2.

TABLE 2

| Surface Number | k | A | B | C | D |
|---|---|---|---|---|---|
| S4 | 0.653439764 | 1.6746E−04 | −1.8921E−06 | 1.7335E−08 | −7.6480E−11 |
| S5 | −5.592268851 | 7.2212E−04 | −1.2951E−05 | 2.1596E−07 | −2.5495E−09 |
| S11 | 0 | 2.0408E−05 | −2.3616E−06 | −7.4698E−08 | −5.8725E−10 |
| S12 | 0 | 1.6594E−04 | −1.2751E−06 | −1.7547E−07 | 9.4587E−10 |
| S14 | 0 | 9.5771E−05 | 1.6721E−07 | 1.1937E−08 | −1.3675E−11 |
| S18 | 0 | −1.7800E−05 | 2.3507E−08 | −1.7389E−09 | 0.0000E+00 |

For the zoom lens 1 of the present embodiment, the effective focal length f3 of the third lens group G3 is equal to 16.20522779 mm, the effective focal length f3a of the third lens front group G31 is equal to 56.93731832 mm, the interval dg3 between the third lens front group G31 and the third lens rear group G32 is equal to 3.91 mm, the effective focal length fw of the zoom lens 1 at wide-angle end is equal to 6.504837689 mm, the lateral magnification β2t of the second lens group G2 at telephoto end is equal to −0.381, the lateral magnification β2w of the second lens group G2 at wide-angle end is equal to −0.242, the lateral magnification β3t of the third lens group G3 at telephoto end is equal to −2.13, and the lateral magnification β3w of the third lens group G3 at wide-angle end is equal to −0.846. According to the above data, the following values can be obtained:

$f3/f3a=0.284$, $dg3/fw=0.601$, $(\beta 2t/\beta 2w)/(\beta 3t/\beta 3w)=0.625$, which respectively satisfy the above conditions (1)-(3).

Figure 4B:
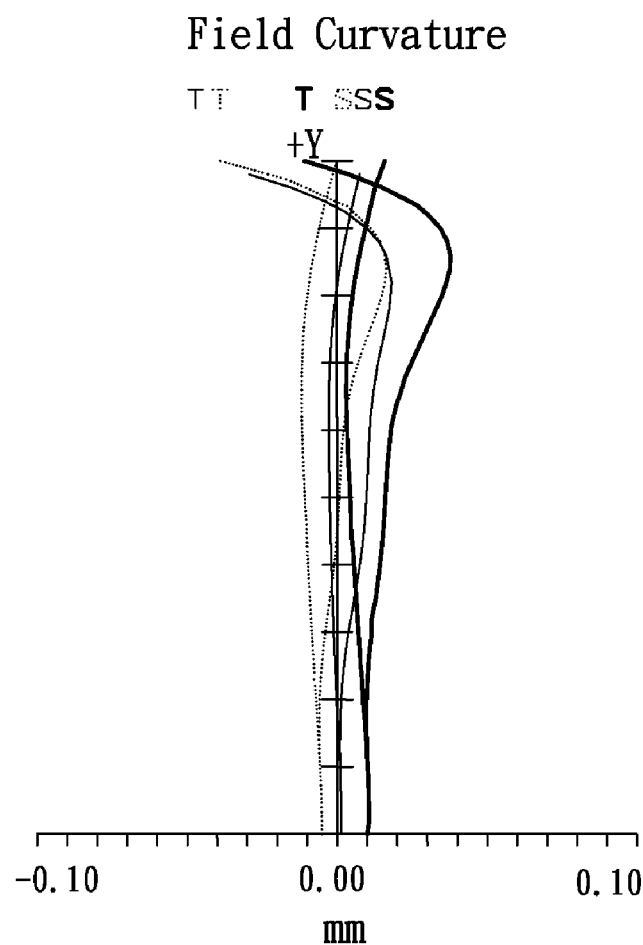
FIG. 4B is a field curvature diagram of a zoom lens at wide-angle end in accordance with an embodiment of the invention.
Figure 4C:
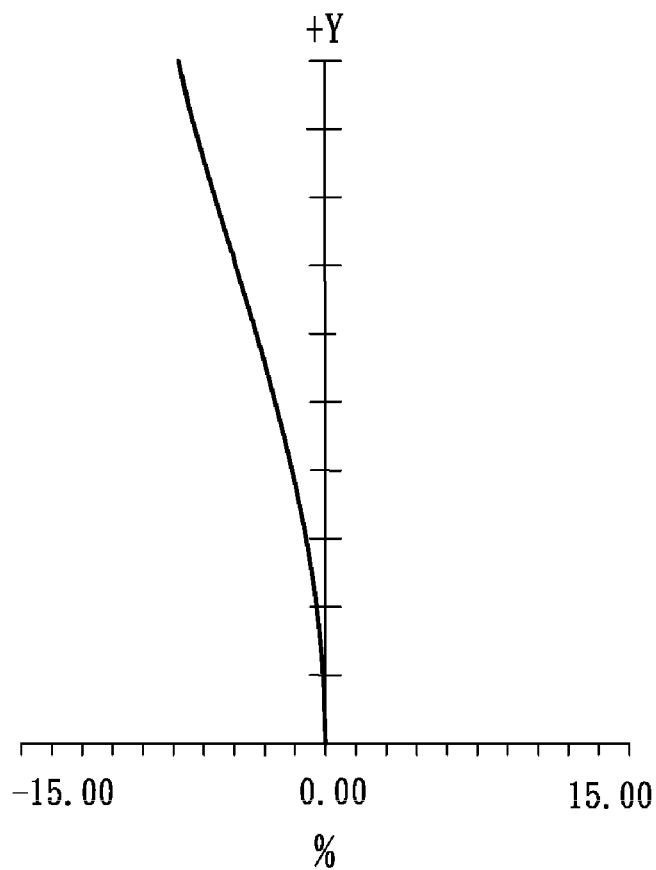
FIG. 4C is a distortion diagram of a zoom lens at wide-angle end in accordance with an embodiment of the invention.
Figure 4D:
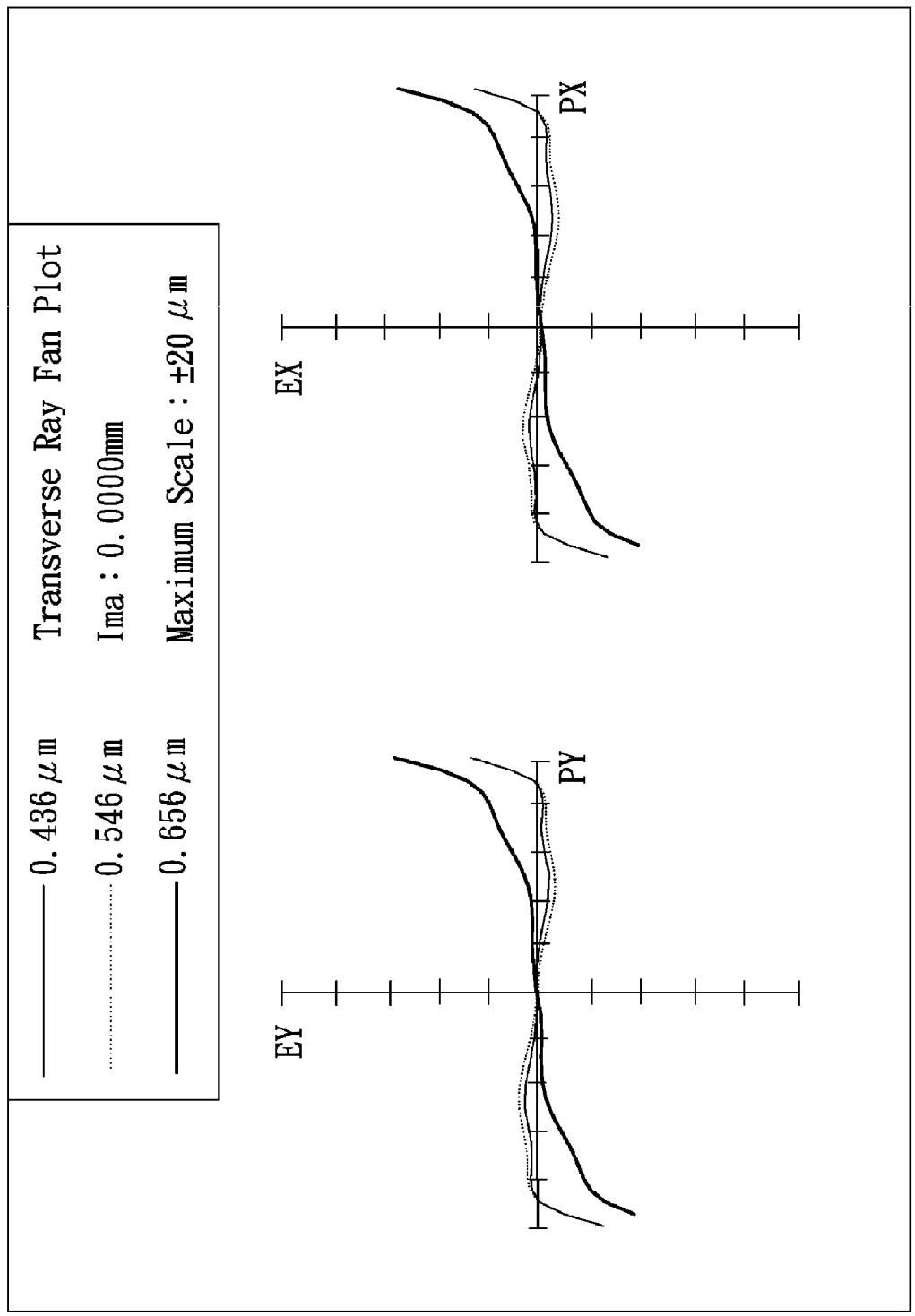
FIG. 4D is a transverse ray fan diagram of a zoom lens at wide-angle end in accordance with an embodiment of the invention.
Figure 4E:
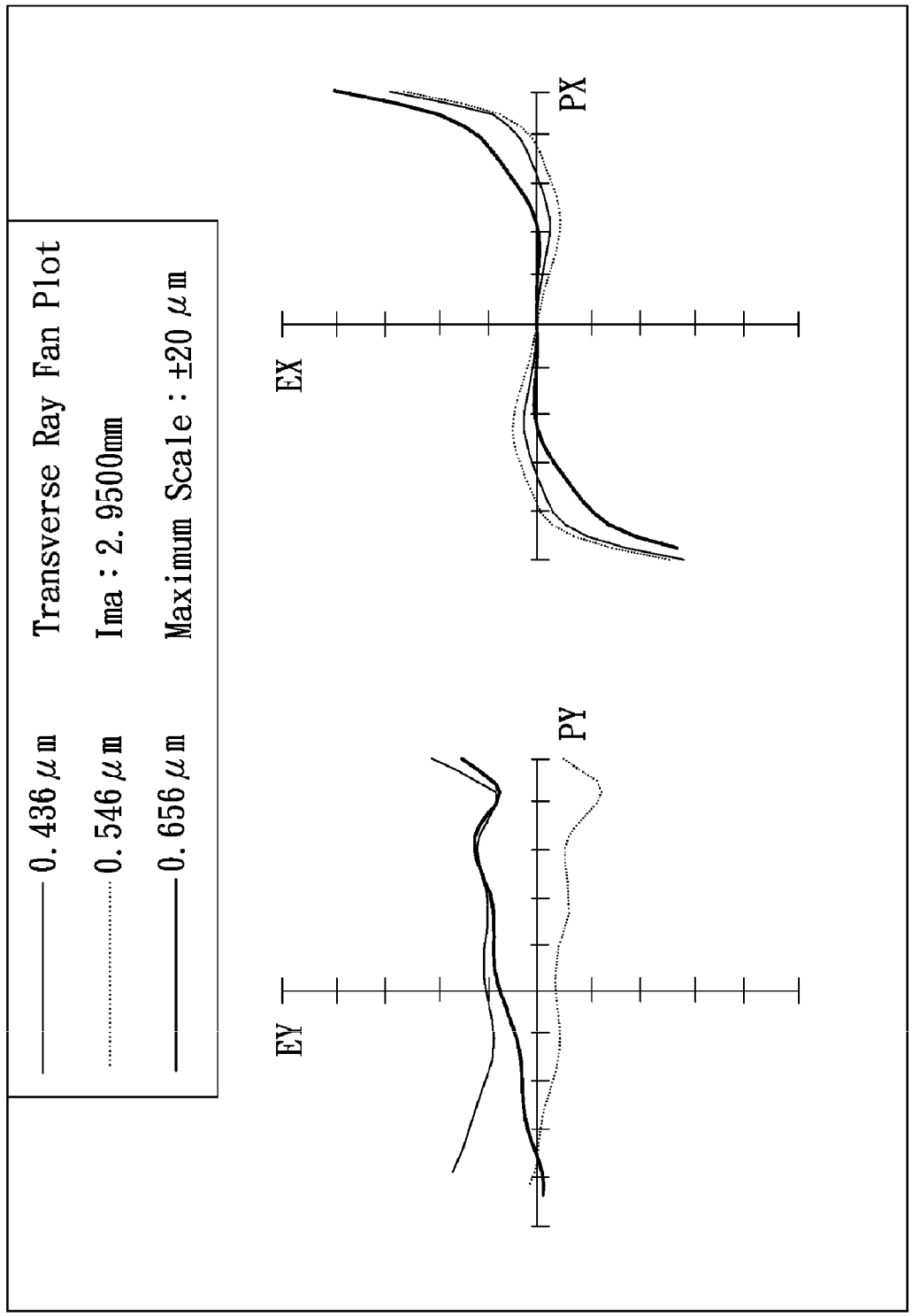
FIG. 4E is a transverse ray fan diagram of a zoom lens at wide-angle end in accordance with an embodiment of the invention.
Figure 4F:
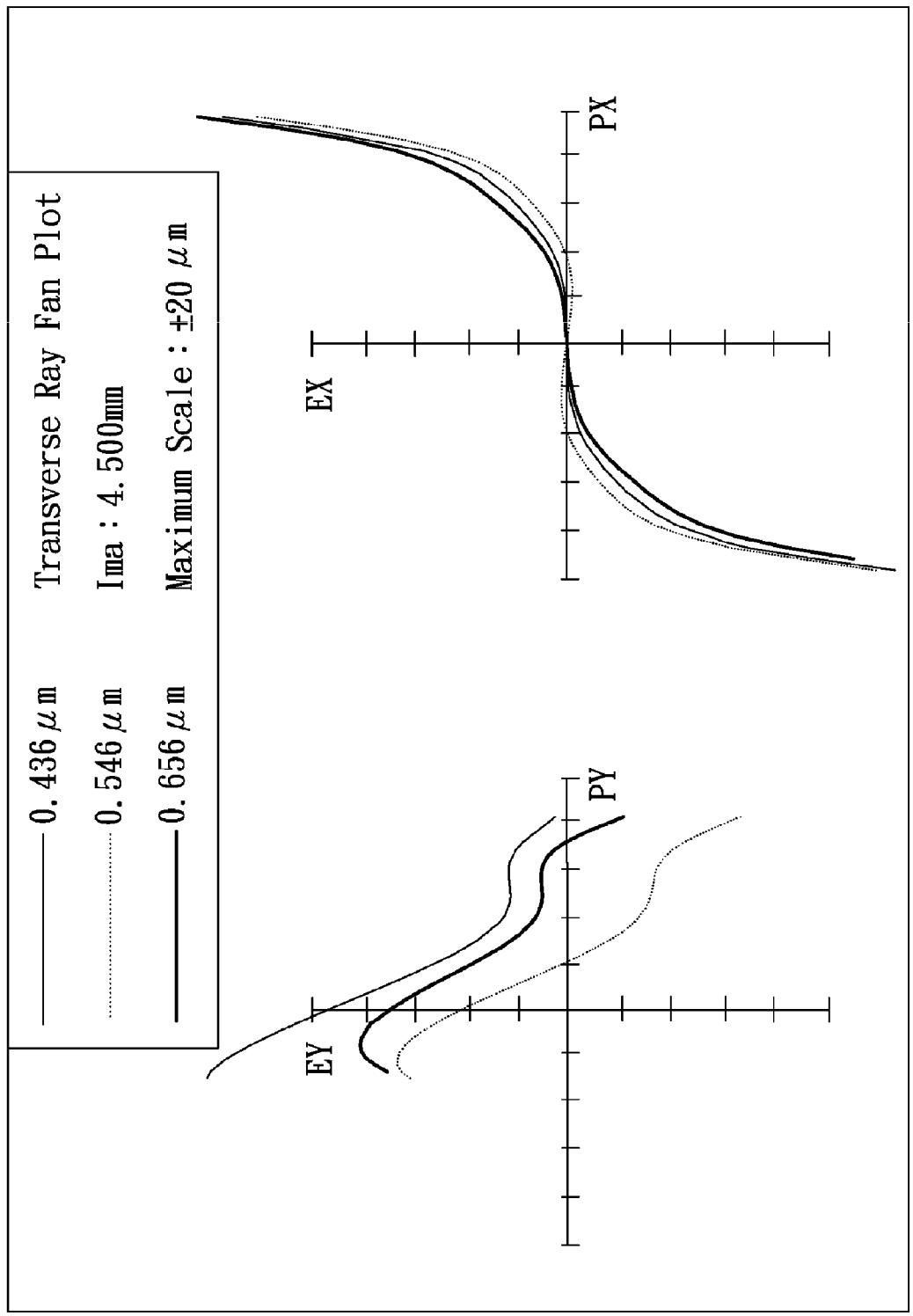
FIG. 4F is a transverse ray fan diagram of a zoom lens at wide-angle end in accordance with an embodiment of the invention.
Figure 5A:
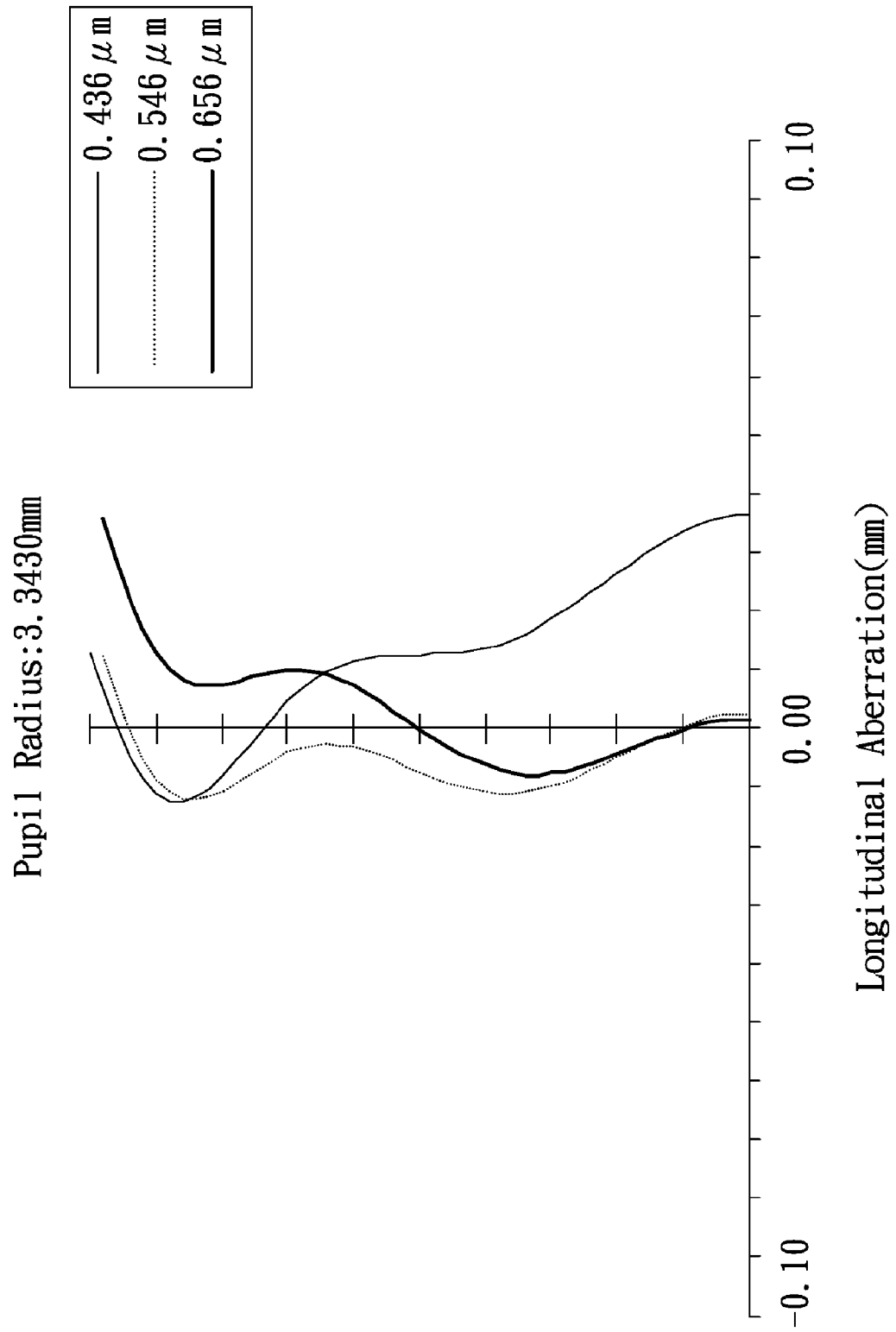
FIG. 5A is a longitudinal aberration diagram of a zoom lens at medium end in accordance with an embodiment of the invention.
Figure 5B:
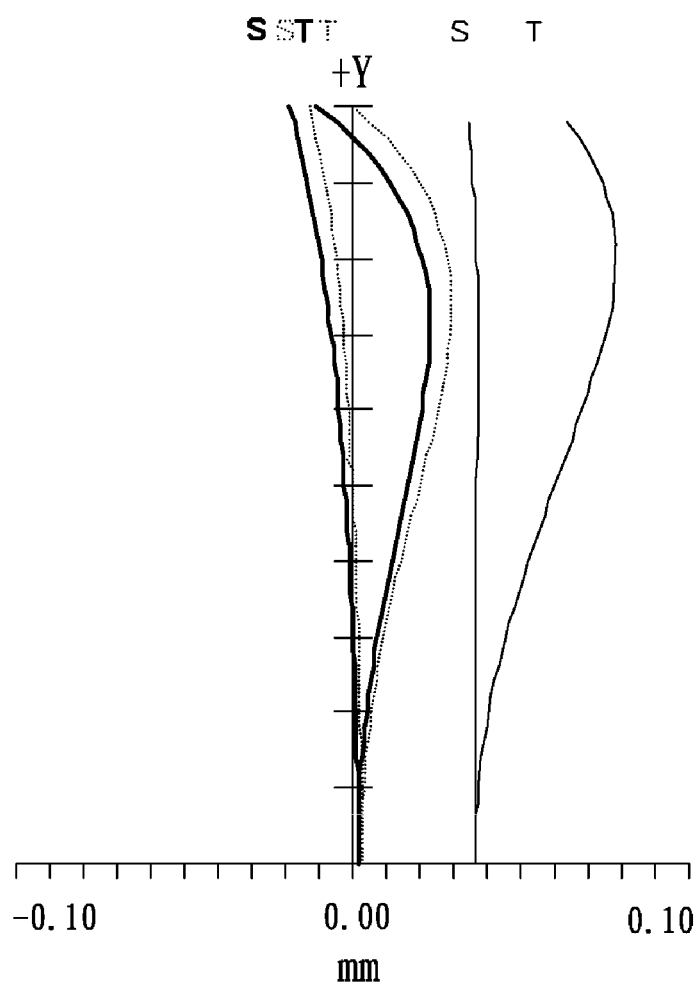
FIG. 5B is a field curvature diagram of a zoom lens at medium end in accordance with an embodiment of the invention.
Figure 5C:
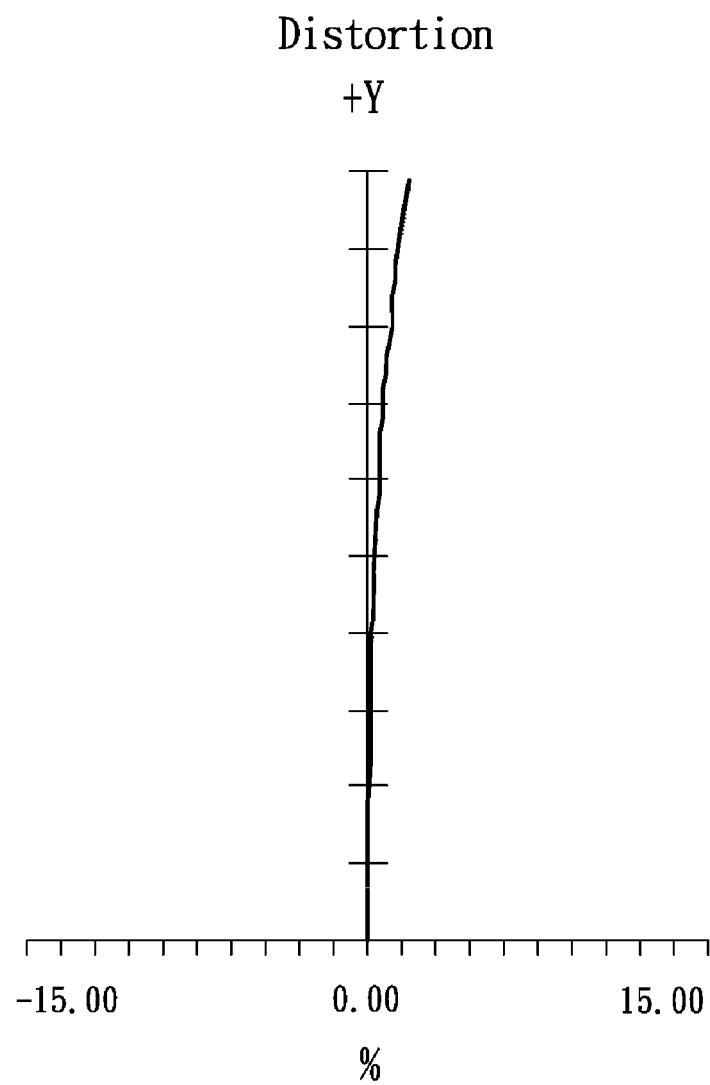
FIG. 5C is a distortion diagram of a zoom lens at medium end in accordance with an embodiment of the invention.
Figure 5D:
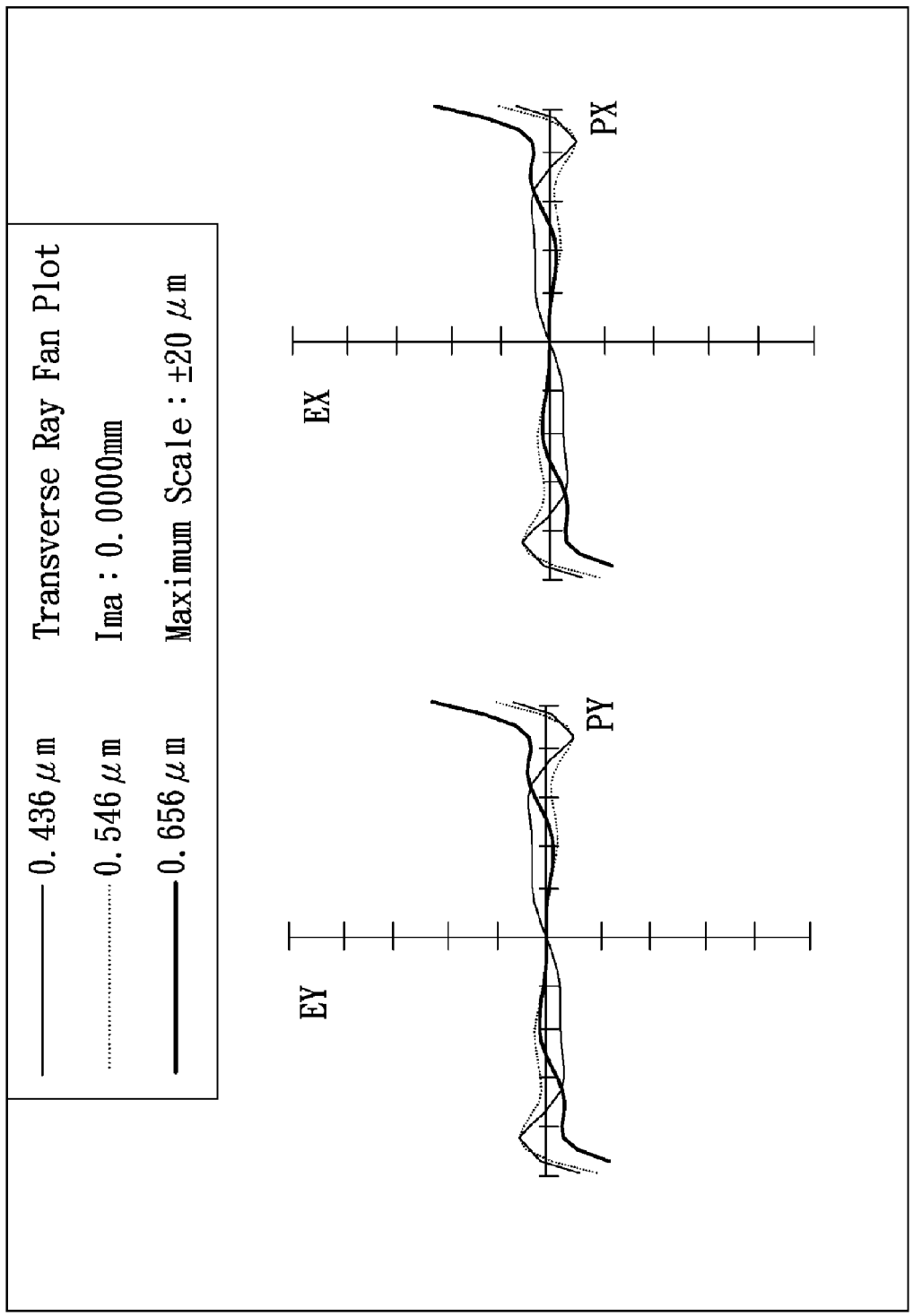
FIG. 5D is a transverse ray fan diagram of a zoom lens at medium end in accordance with an embodiment of the invention.
Figure 5E:
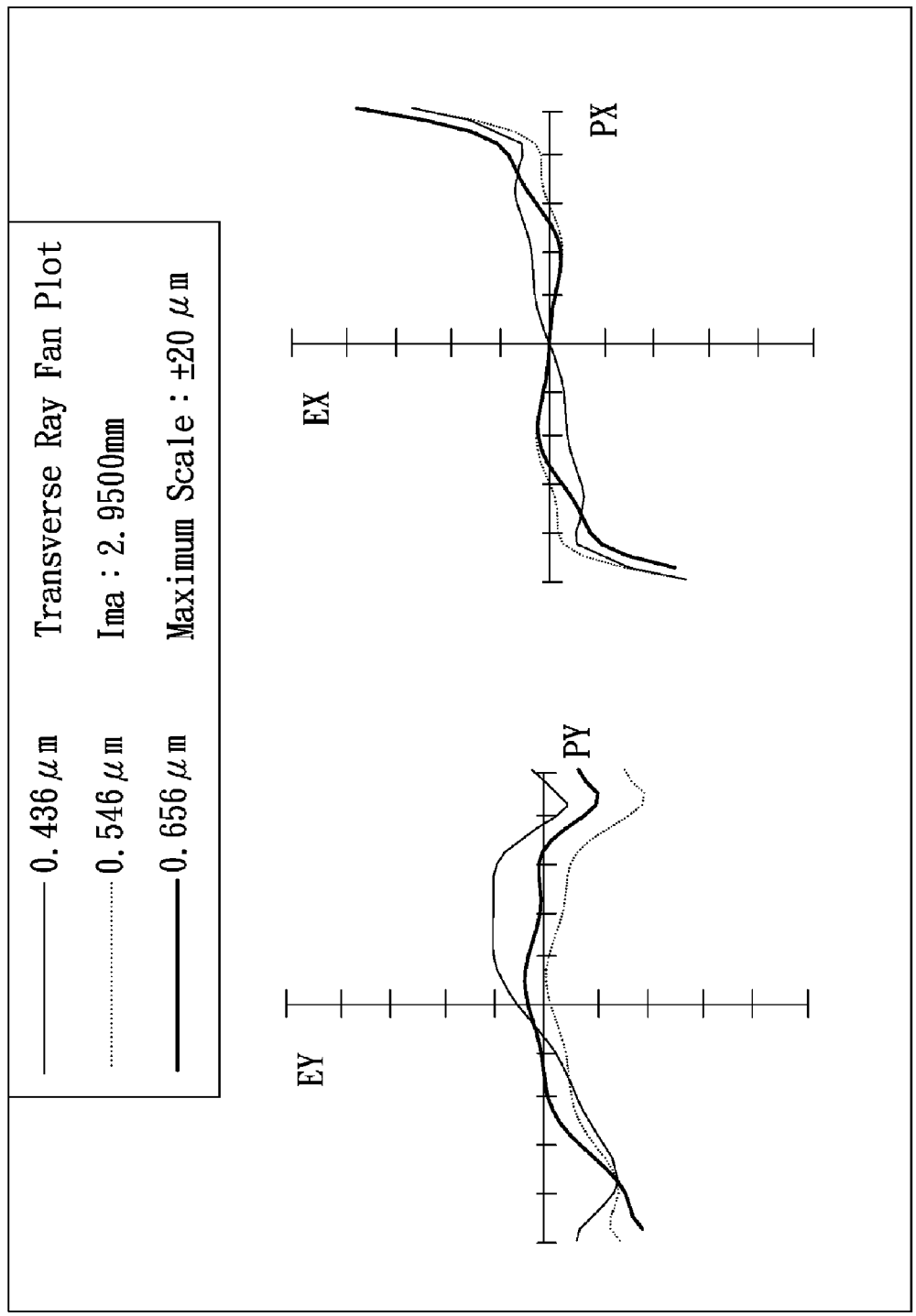
FIG. 5E is a transverse ray fan diagram of a zoom lens at medium end in accordance with an embodiment of the invention.
Figure 5F:
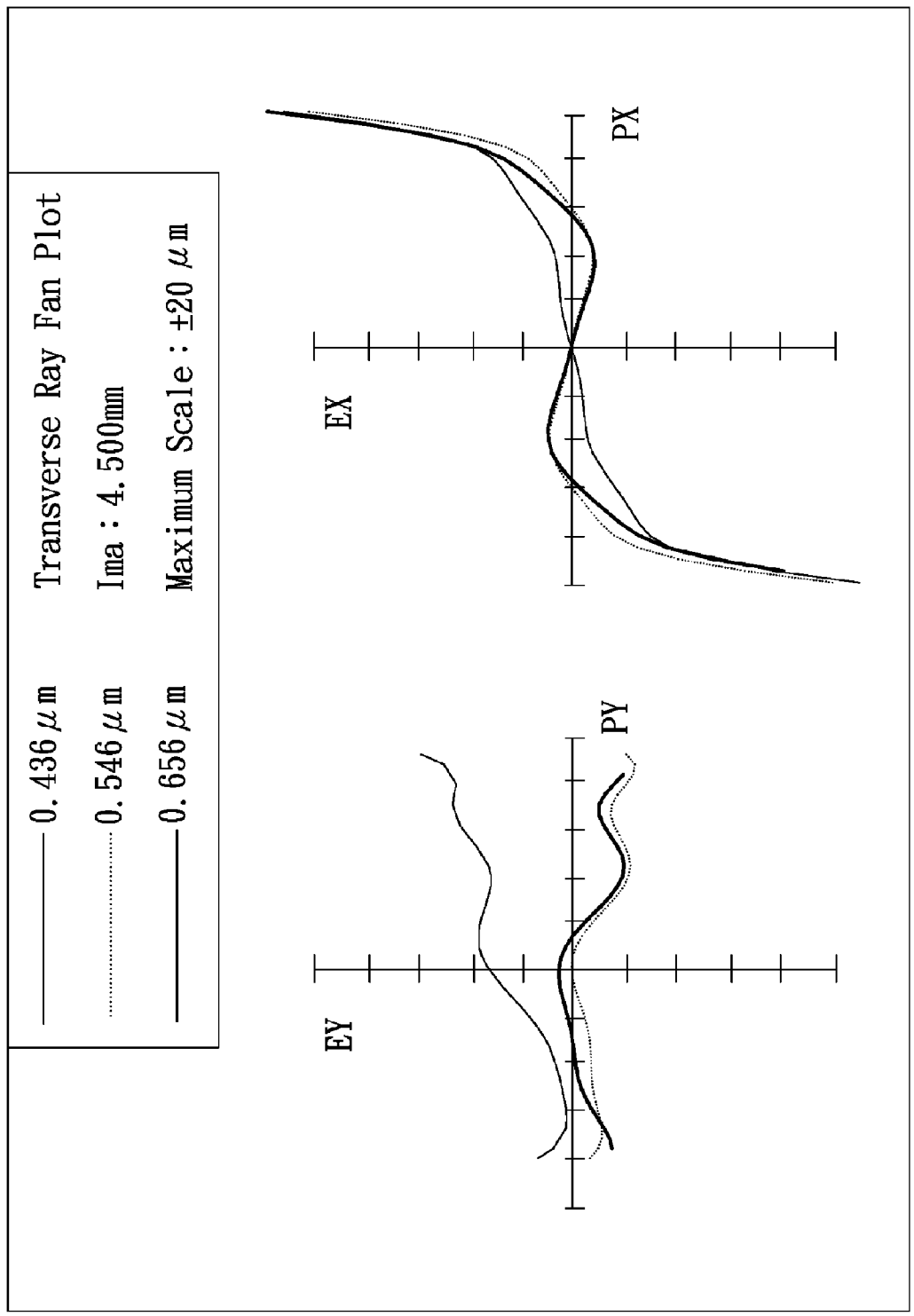
FIG. 5F is a transverse ray fan diagram of a zoom lens at medium end in accordance with an embodiment of the invention.
Figure 5G:
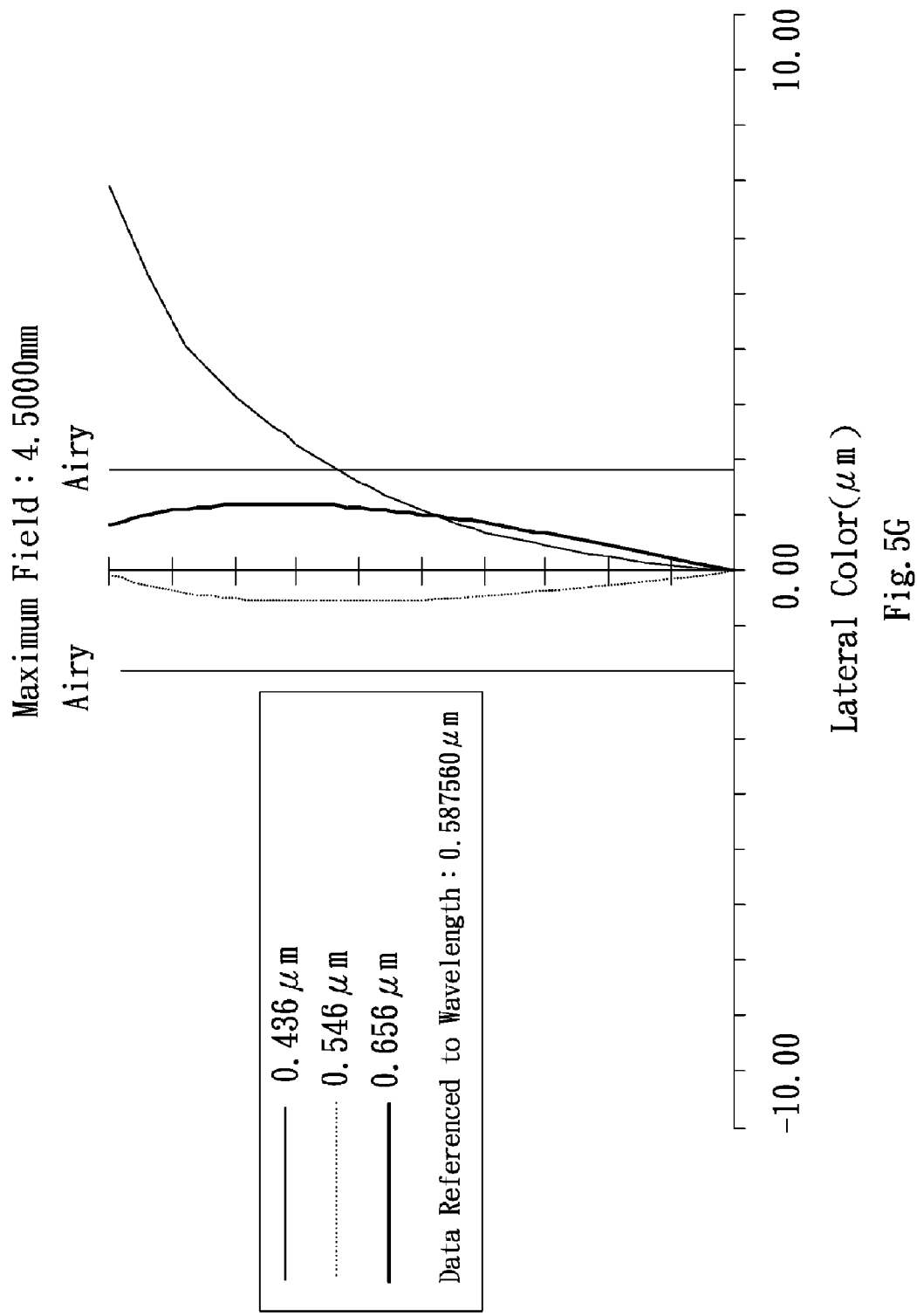
FIG. 5G is a lateral color diagram of a zoom lens at medium end in accordance with an embodiment of the invention.
Figure 6B:
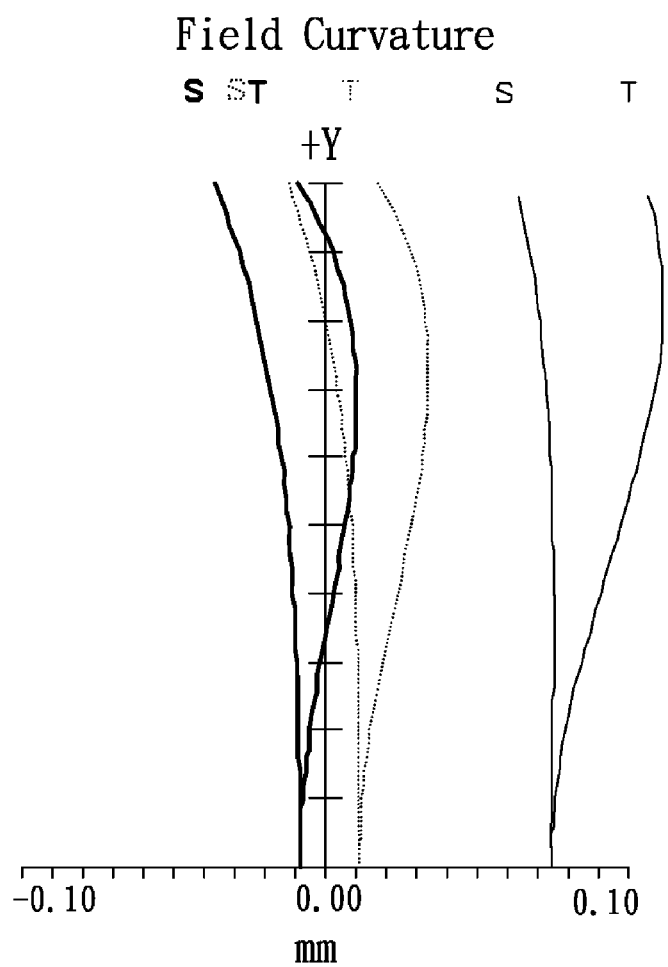
FIG. 6B is a field curvature diagram of a zoom lens at telephoto end in accordance with an embodiment of the invention.
Figure 6C:
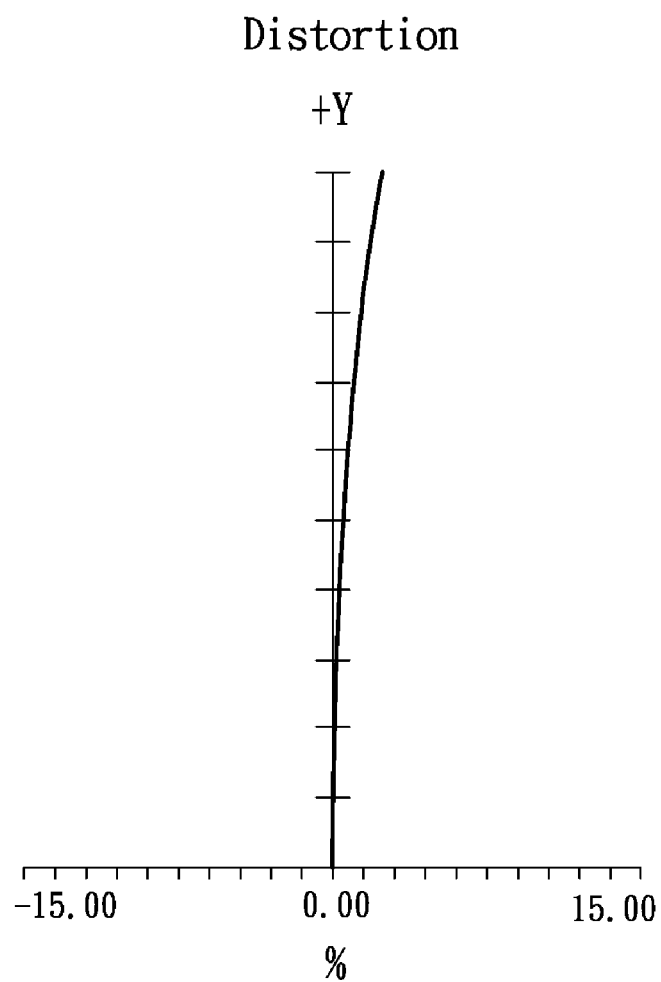
FIG. 6C is a distortion diagram of a zoom lens at telephoto end in accordance with an embodiment of the invention.
Figure 6D:
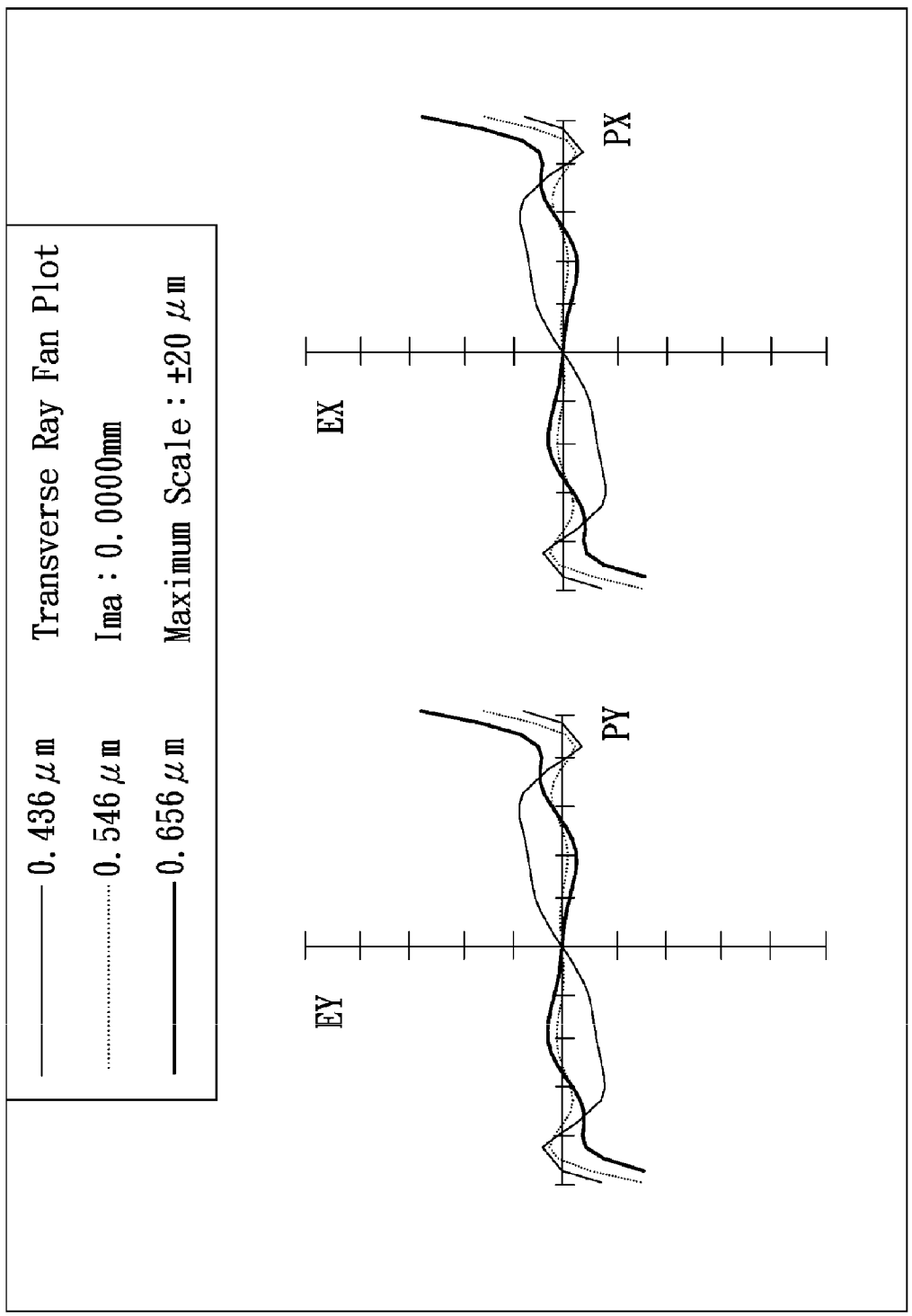
FIG. 6D is a transverse ray fan diagram of a zoom lens at telephoto end in accordance with an embodiment of the invention.
Figure 6E:
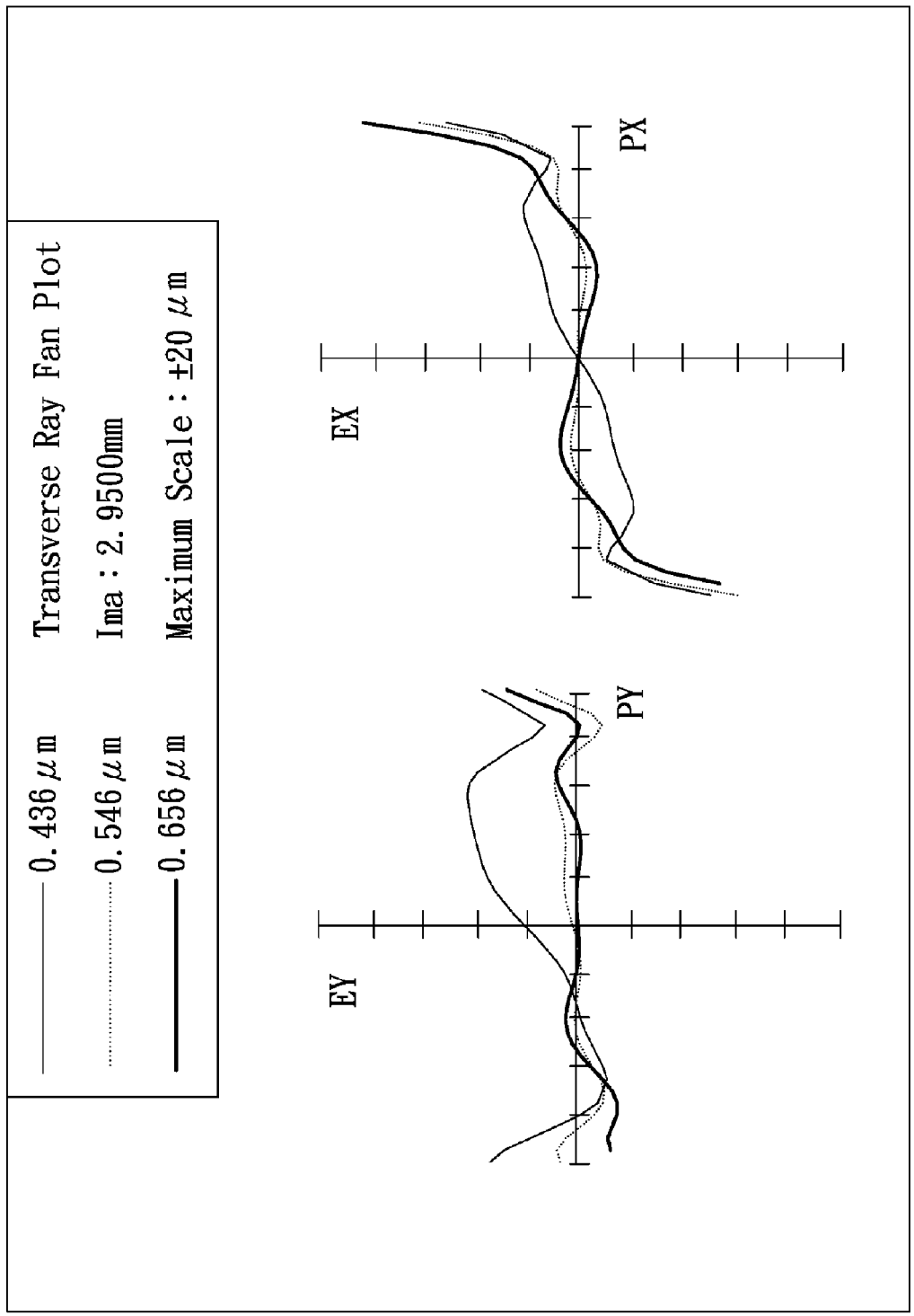
FIG. 6E is a transverse ray fan diagram of a zoom lens at telephoto end in accordance with an embodiment of the invention.
Figure 6F:
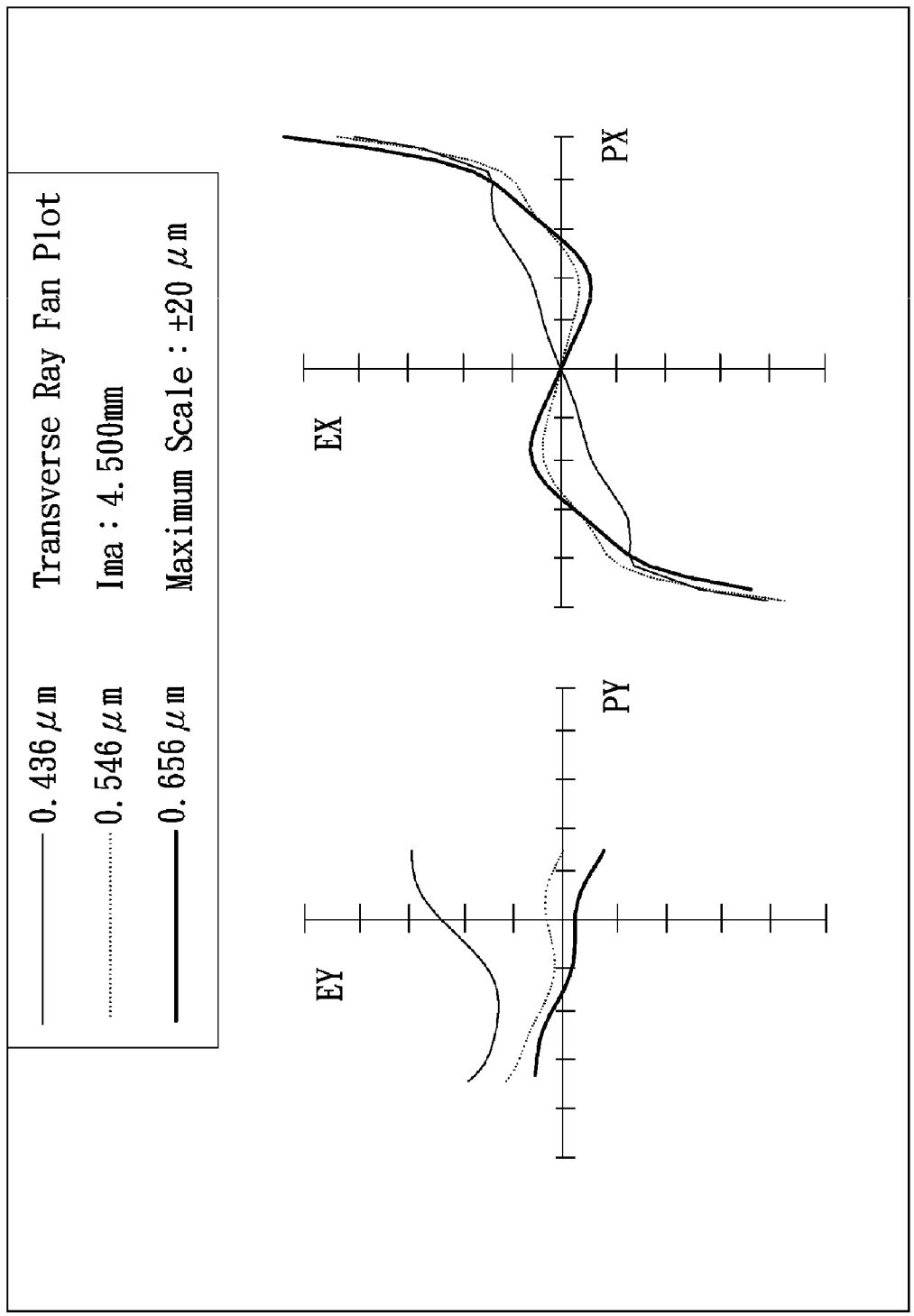
FIG. 6F is a transverse ray fan diagram of a zoom lens at telephoto end in accordance with an embodiment of the invention.
Figure 6G:
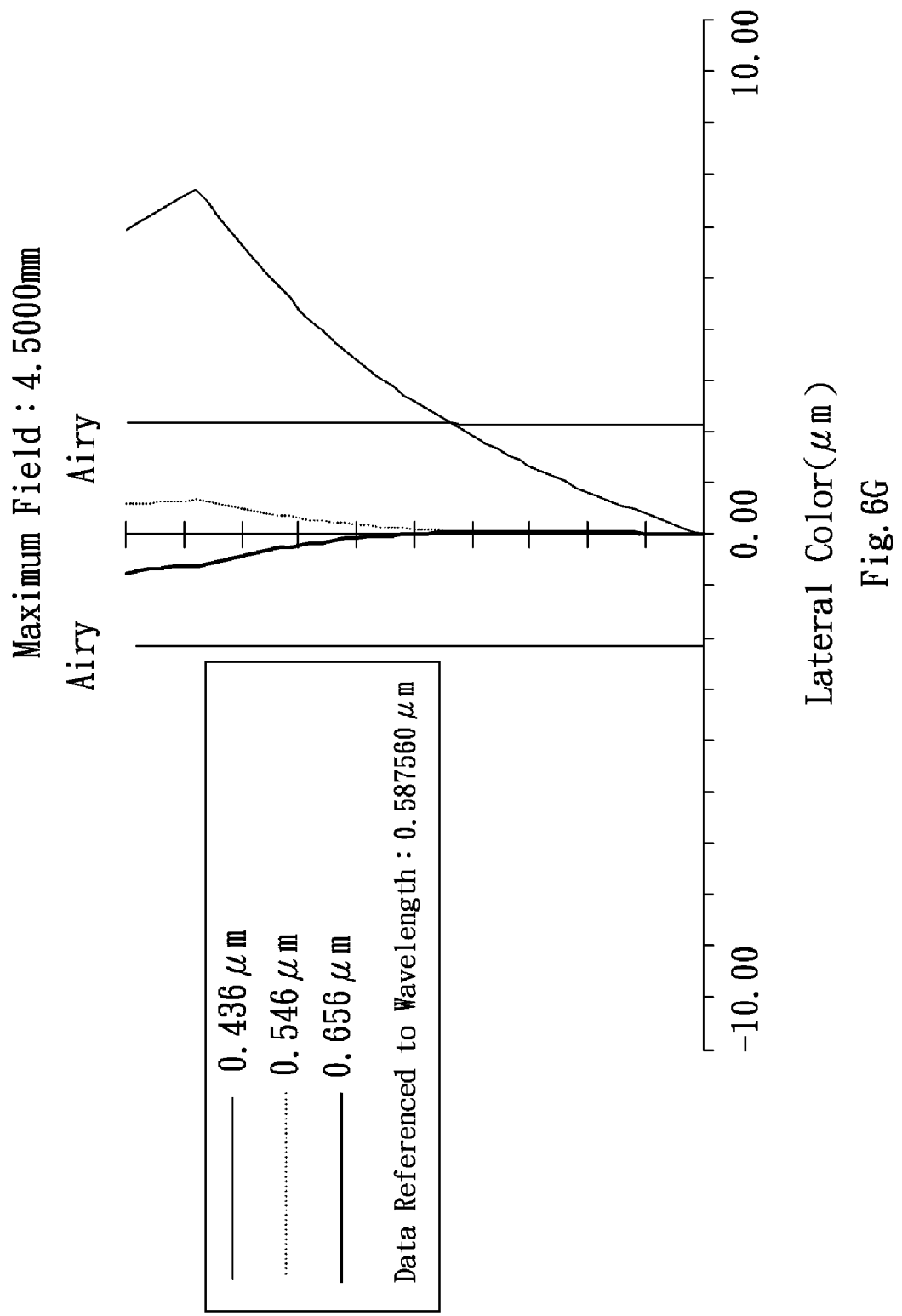
FIG. 6G is a lateral color diagram of a zoom lens at telephoto end in accordance with an embodiment of the invention.

By the above arrangements of the lenses and stop ST, the zoom lens 1 of the present embodiment at the wide-angle end, medium end and telephoto end can meet the requirements of optical performance as seen in FIGS. 4A-4G, FIGS. 5A-5G and FIGS. 6A-6G wherein FIG. 4A, FIG. 5A and FIG. 6A show the longitudinal aberration diagram of the zoom lens 1 of the present embodiment at the wide-angle end, medium end and telephoto end, FIG. 4B, FIG. 5B and FIG. 6B show the field curvature diagram of the zoom lens 1 of the present embodiment at the wide-angle end, medium end and telephoto end, FIG. 4C, FIG. 5C and FIG. 6C show the distortion diagram of the zoom lens 1 of the present embodiment at the wide-angle end, medium end and telephoto end, FIGS. 4D-4F, FIGS. 5D-5F and FIGS. 6D-6F show the transverse ray fan diagram of the zoom lens 1 of the present embodiment at the wide-angle end, medium end and telephoto end, and FIG. 4G, FIG. 5G and FIG. 6G show the lateral color diagram of the zoom lens 1 of the present embodiment at the wide-angle end, medium end and telephoto end.

It can be seen from FIG. 4A that the longitudinal aberration in the zoom lens 1 of the present embodiment at the wide-angle end ranges between −0.02 mm and 0.04 mm for the wavelength range between 0.436 μm and 0.656 μm. It can be seen from FIG. 4B that the field curvature of tangential direction and sagittal direction in the zoom lens 1 of the present embodiment at the wide-angle end ranges between −0.04 mm and 0.04 mm for the wavelength range between 0.436 μm and 0.656 μm. It can be seen from FIG. 4C (the three lines in the figure almost coincide to appear as if a signal line) that the distortion in the zoom lens 1 of the present embodiment at the wide-angle end does not exceed plus or minus 7.5% for the wavelength range between 0.436 μm and 0.656 μm. It can be seen from FIG. 4D, FIG. 4E and FIG. 4F that the transverse ray fan of different image highs in the zoom lens 1 of the present embodiment at the wide-angle end does not exceed plus or minus 30 μm for the wavelength range between 0.436 μm and 0.656 μm. It can be seen from FIG. 4G that the lateral color of different fields with reference wavelength is equal to 0.587560 μm in the zoom lens 1 of the present embodiment at the wide-angle end ranges between −3 μm and 8 μm for the wavelength range between 0.436 μm and 0.656 μm. It is obvious that the longitudinal aberration, the field curvature, the distortion and the lateral color of the zoom lens 1 of the present embodiment at the wide-angle end can be corrected effectively, thereby capable of obtaining good optical performance.

It can be seen from FIG. 5A that the longitudinal aberration in the zoom lens 1 of the present embodiment at the medium end ranges between −0.02 mm and 0.04 mm for the wavelength range between 0.436 μm and 0.656 μm. It can be seen from FIG. 5B that the field curvature of tangential direction and sagittal direction in the zoom lens 1 of the present embodiment at medium end ranges between −0.02 mm and 0.08 mm for the wavelength range between 0.436 μm and 0.656 μm. It can be seen from FIG. 5C (the three lines in the figure almost coincide to appear as if a signal line) that the distortion in the zoom lens 1 of the present embodiment at the medium end does not exceed plus or minus 3% for the wavelength range between 0.436 μm and 0.656 μm. It can be seen from FIG. 5D, FIG. 5E and FIG. 5F that the transverse ray fan of different image highs in the zoom lens 1 of the present embodiment at the medium end does not exceed plus or minus 24 μm for the wavelength range between 0.436 μm and 0.656 μm. It can be seen from FIG. 5G that the lateral color of different fields with reference wavelength is equal to 0.587560 μm in the zoom lens 1 of the present embodiment at the medium end ranges between −1 μm and 7 μm for the wavelength range between 0.436 μm and 0.656 μm. It is obvious that the longitudinal aberration, the field curvature, the distortion and the lateral color of the zoom lens 1 of the present embodiment at the medium end can be corrected effectively, thereby capable of obtaining good optical performance.

It can be seen from FIG. 6A that the longitudinal aberration in the zoom lens 1 of the present embodiment at the telephoto end ranges between −0.02 mm and 0.08 mm for the wavelength range between 0.436 μm and 0.656 μm. It can be seen from FIG. 6B that the field curvature of tangential direction and sagittal direction in the zoom lens 1 of the present embodiment at the telephoto end ranges between −0.04 mm and 0.12 mm for the wavelength range between 0.436 μm and 0.656 μm. It can be seen from FIG. 6C (the three lines in the figure almost coincide to appear as if a signal line) that the distortion in the zoom lens 1 of the present embodiment at the telephoto end does not exceed plus or minus 3% for the wavelength range between 0.436 μm and 0.656 μm. It can be seen from FIG. 6D, FIG. 6E and FIG. 6F that the transverse ray fan of different image highs in the zoom lens 1 of the present embodiment at the telephoto end does not exceed plus or minus 22 μm for the wavelength range between 0.436 μm and 0.656 μm. It can be seen from FIG. 6G that the lateral color of different fields with reference wavelength is equal to 0.587560 μm in the zoom lens 1 of the present embodiment at the telephoto end ranges between −1 μm and 7 μm for the wavelength range between 0.436 μm and 0.656 μm. It is obvious that the longitudinal aberration, the field curvature, the distortion and the lateral color of the zoom lens 1 of the present embodiment at the telephoto end can be corrected effectively, thereby capable of obtaining good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens comprising a first lens group, a second lens group, a third lens group and a fourth lens group, all of which are arranged in sequence from an object side to an image side along an optical axis, wherein:
   the first lens group is with positive refractive power and comprises a first lens and a second lens, both of which are arranged in sequence from the object side to the image side along the optical axis, wherein the first lens is with negative refractive power and the second lens is with positive refractive power;
   the second lens group is with negative refractive power;
   the third lens group is with positive refractive power and comprises a third lens front group and a third lens rear group, both of which are arranged in sequence from the object side to the image side along the optical axis, wherein the third lens front group is with positive refractive power and the third lens rear group is with positive refractive power; wherein the third lens front group comprises a lens with positive refractive power, which comprises two surfaces, wherein both of the surfaces are aspheric surfaces;
   the fourth lens group is with positive refractive power; and the third lens group satisfies:

$$0.2 < f3/f3a < 0.7$$

wherein f3 is an effective focal length of the third lens group and f3a is an effective focal length of the third lens front group.

2. The zoom lens as claimed in claim 1, wherein the first lens group, the second lens group, the third lens group and the fourth lens group are movable along the optical axis when the zoom lens zooms.

3. The zoom lens as claimed in claim 2, wherein an interval between the first lens group and the second lens group increases, an interval between the second lens group and the third lens group decreases and an interval between the third lens group and the fourth lens group varies when the zoom lens zooms from wide-angle end to telephoto end.

4. The zoom lens as claimed in claim 1, wherein the third lens group satisfies: $0.21 < dg3/fw < 0.8$ wherein dg3 is an interval between the third lens front group and the third lens rear group, and fw is an effective focal length of the zoom lens at wide-angle end.

5. The zoom lens as claimed in claim 1, wherein the fourth lens group comprises a lens, the lens is with positive refractive power.

6. The zoom lens as claimed in claim 5, wherein the lens is made of plastic material.

7. The zoom lens as claimed in claim 6, wherein the lens comprises two surfaces, at least one of which is an aspheric surface.

8. The zoom lens as claimed in claim 7, wherein both of the surfaces are aspheric surfaces.

9. The zoom lens as claimed in claim 1, further comprising a stop disposed between the second lens group and the third lens group, wherein an interval between the stop and the third lens group is stationary.

10. The zoom lens as claimed in claim 1, further comprising an optical filter disposed between the fourth lens group and an image plane.

11. A zoom lens comprising a first lens group, a second lens group, a third lens group and a fourth lens group, all of which are arranged in sequence from an object side to an image side along an optical axis, wherein:
    the first lens group is with positive refractive power and comprises a first lens and a second lens, both of which are arranged in sequence from the object side to the image side along the optical axis, wherein the first lens is with negative refractive power and the second lens is with positive refractive power;
    the second lens group is with negative refractive power;
    the third lens group is with positive refractive power and comprises a third lens front group and a third lens rear group, both of which are arranged in sequence from the object side to the image side along the optical axis, wherein the third lens front group is with positive refractive power and the third lens rear group is with positive refractive power;
    the fourth lens group is with positive refractive power; and the second lens group and the third lens group satisfy:

$$0.32 < (\beta 2t/\beta 2w)/(\beta 3t/\beta 3w) < 0.7$$

wherein β2w is a lateral magnification of the second lens group at wide-angle end, β2t is a lateral magnification of the second lens group at telephoto end, β3w is a lateral magnification of the third lens group at wide-angle end, and β3t is a lateral magnification of the third lens group at telephoto end.

12. A zoom lens comprising a first lens group, a second lens group, a third lens group and a fourth lens group, all of which are arranged in sequence from an object side to an image side along an optical axis, wherein: the first lens group is with positive refractive power and comprises a first lens and a second lens, both of which are arranged in sequence from the object side to the image side along the optical axis, wherein the first lens is with negative refractive power and the second lens is with positive refractive power; the second lens group is with negative refractive power; the third lens group is with positive refractive power and comprises a third lens front group and a third lens rear group, both of which are arranged in sequence from the object side to the image side along the optical axis, wherein the third lens front group is with positive refractive power and the third lens rear group is with positive refractive power; the fourth lens group is with positive refractive power; and the third lens group satisfies: $0.2 < f3/f3a < 0.7$ wherein f3 is an effective focal length of the third lens group and f3a is an effective focal length of the third lens front group, wherein the third lens rear group comprises a third lens, a fourth lens and a fifth lens, all of which are arranged in sequence from the object side to the image side along the optical axis, wherein the third lens is with positive refractive power, the fourth lens is with positive refractive power and the fifth lens is with negative refractive power.

13. The zoom lens as claimed in claim 12, wherein the third lens comprises two surfaces, at least one of which is an aspheric surface.

14. The zoom lens as claimed in claim 13, wherein both of the surfaces are aspheric surfaces.

15. The zoom lens as claimed in claim 12, wherein the fourth lens comprises two surfaces, at least one of which is an aspheric surface.

16. The zoom lens as claimed in claim 15, wherein both of the surfaces are aspheric surfaces.

17. The zoom lens as claimed in claim 12, wherein the fifth lens comprises two surfaces, at least one of which is an aspheric surface.

18. The zoom lens as claimed in claim 17, wherein both of the surfaces are aspheric surfaces.

* * * * *